(12) United States Patent
Umezawa et al.

(10) Patent No.: US 7,381,323 B2
(45) Date of Patent: Jun. 3, 2008

(54) FILTRATION APPARATUS

(75) Inventors: Hiroyuki Umezawa, Gunma (JP);
Masahiro Iseki, Gunma (JP);
Motoyuki Tsuihiji, Gunma (JP)

(73) Assignees: Sanyo Aqua Technology Co., Ltd.,
Ora-gun, Gunma; Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/499,554

(22) Filed: Aug. 4, 2006

(65) Prior Publication Data

US 2006/0266687 A1 Nov. 30, 2006

Related U.S. Application Data

(62) Division of application No. 10/831,585, filed on Apr. 23, 2004.

(30) Foreign Application Priority Data

Apr. 25, 2003  (JP) .......................... P.2003-122583
Apr. 25, 2003  (JP) .......................... P.2003-122584
Apr. 25, 2003  (JP) .......................... P.2003-122585
Apr. 25, 2003  (JP) .......................... P.2003-122586

(51) Int. Cl.
*B01D 29/00* (2006.01)
*B01D 29/62* (2006.01)
*B01D 37/02* (2006.01)
*B01D 21/02* (2006.01)

(52) U.S. Cl. .................... 210/108; 210/193; 210/407; 210/408; 210/411; 210/534; 210/739; 210/777; 210/791; 210/803

(58) Field of Classification Search .................... None
See application file for complete search history.

(56) References Cited

U.S. PATENT DOCUMENTS

| | | | |
|---|---|---|---|
| 3,837,629 A * | 9/1974 | Matras et al. ............ | 261/122.1 |
| 4,952,317 A | 8/1990 | Culkin | |
| 5,192,456 A * | 3/1993 | Ishida et al. ................ | 210/791 |
| 5,403,479 A * | 4/1995 | Smith et al. ........... | 210/321.69 |
| 5,643,455 A * | 7/1997 | Kopp et al. ................ | 210/636 |
| 5,910,250 A * | 6/1999 | Mahendran et al. ........ | 210/636 |
| 6,245,239 B1 * | 6/2001 | Cote et al. ................ | 210/636 |
| 6,280,626 B1 * | 8/2001 | Miyashita et al. .......... | 210/636 |
| 6,284,135 B1 * | 9/2001 | Ookata ...................... | 210/220 |

(Continued)

FOREIGN PATENT DOCUMENTS

EP          1055445 A2 * 11/2000
JP       A 2001-157894    6/2001

*Primary Examiner*—Robert James Popovics
(74) *Attorney, Agent, or Firm*—Fish & Richardson P.C.

(57) ABSTRACT

A filtration apparatus is provided which is easy to maintain, manage and which enables preservation of filtration characteristics due to the fact that filtration is carried out by use of a gelatinous filter apparatus. In the filtration apparatus, filtration characteristics can be maintained by providing a bubble supplying mechanism for removing a sedimentary layer comprising removables that is formed on a surface of a filtration film and a filtration characteristics restoring mechanism for restoring the filter film clogged by the removables by causing a back-flow of filtered water accumulated in a cistern. Filtration apparatus maintenance and management are facilitated by improving recovery efficiency of the precipitated removables by tapering a lower part inside a raw water tank and providing a recovery tank for recovering removables via a valve.

15 Claims, 18 Drawing Sheets

U.S. PATENT DOCUMENTS

| | | | |
|---|---|---|---|
| 6,325,938 B1* | 12/2001 | Miyashita et al. | 210/636 |
| 6,328,886 B1* | 12/2001 | Miyashita et al. | 210/220 |
| 6,331,251 B1* | 12/2001 | Del Vecchio et al. | 210/636 |
| 6,361,695 B1* | 3/2002 | Husain et al. | 210/614 |
| 6,402,955 B2* | 6/2002 | Ookata | 210/636 |
| 6,447,674 B1 | 9/2002 | Simon et al. | |
| 6,471,869 B1* | 10/2002 | Yanou et al. | 210/651 |
| 6,547,968 B1* | 4/2003 | Rabie et al. | 210/636 |
| 6,550,747 B2* | 4/2003 | Rabie et al. | 261/23.1 |
| 6,616,843 B1* | 9/2003 | Behmann et al. | 210/605 |
| 6,706,189 B2* | 3/2004 | Rabie et al. | 210/636 |
| 6,708,957 B2* | 3/2004 | Cote et al. | 261/123.1 |
| 6,863,817 B2* | 3/2005 | Liu et al. | 210/605 |
| 6,871,757 B2 | 3/2005 | Bennington et al. | |
| 6,899,812 B2* | 5/2005 | Cote et al. | 210/636 |
| 6,969,465 B2* | 11/2005 | Zha et al. | 210/636 |
| 7,025,885 B2* | 4/2006 | Cote et al. | 210/650 |
| 7,186,343 B2* | 3/2007 | Rabie et al. | 210/636 |
| 7,198,721 B2* | 4/2007 | Cote et al. | 210/636 |
| 2001/0027950 A1* | 10/2001 | Rabie et al. | 210/636 |
| 2002/0130080 A1* | 9/2002 | Cote et al. | 210/650 |
| 2002/0139748 A1* | 10/2002 | Cote et al. | 210/636 |
| 2002/0170863 A1* | 11/2002 | Singh et al. | 210/798 |
| 2003/0127389 A1* | 7/2003 | Rabie et al. | 210/636 |
| 2003/0146153 A1* | 8/2003 | Cote et al. | 210/636 |
| 2004/0007525 A1* | 1/2004 | Rabie et al. | 210/636 |
| 2004/0007527 A1* | 1/2004 | Pedersen et al. | 210/650 |
| 2004/0035780 A1* | 2/2004 | Mahendran et al. | 210/321.8 |
| 2004/0108268 A1* | 6/2004 | Liu et al. | 210/605 |
| 2004/0112831 A1* | 6/2004 | Rabie et al. | 210/636 |
| 2004/0113293 A1* | 6/2004 | Rabie et al. | 261/122.1 |
| 2004/0124132 A1* | 7/2004 | Singh et al. | 210/252 |
| 2004/0188348 A1* | 9/2004 | Yamasaki et al. | 210/631 |
| 2004/0262209 A1 | 12/2004 | Umezawa et al. | |
| 2005/0061725 A1* | 3/2005 | Liu et al. | 210/220 |
| 2005/0077227 A1* | 4/2005 | Kirker et al. | 210/321.69 |
| 2005/0082227 A1* | 4/2005 | Cote et al. | 210/650 |
| 2005/0115900 A1* | 6/2005 | Cote et al. | 210/636 |
| 2005/0139538 A1* | 6/2005 | Lazaredes | 210/321.69 |
| 2005/0178729 A1* | 8/2005 | Rabie et al. | 210/636 |
| 2005/0194310 A1* | 9/2005 | Yamamoto et al. | 210/605 |
| 2006/0006112 A1* | 1/2006 | Rabie et al. | 210/636 |
| 2006/0033220 A1* | 2/2006 | Singh et al. | 261/23.1 |
| 2006/0091075 A1* | 5/2006 | Cote et al. | 210/636 |
| 2006/0213834 A1* | 9/2006 | Kando et al. | 210/636 |
| 2006/0261007 A1* | 11/2006 | Zha et al. | 210/636 |
| 2006/0266685 A1 | 11/2006 | Umezawa et al. | |
| 2006/0266686 A1 | 11/2006 | Umezawa et al. | |
| 2006/0266687 A1 | 11/2006 | Umezawa et al. | |
| 2006/0266705 A1* | 11/2006 | Janson et al. | 210/636 |
| 2006/0273038 A1* | 12/2006 | Syed et al. | 210/723 |
| 2007/0007205 A1* | 1/2007 | Johnson et al. | 210/636 |

* cited by examiner

FIG.6

| | | Gel film forming process | Filtration process | Regeneration process | Stop valve | Regeneration fluid collection | Maintenance process | |
|---|---|---|---|---|---|---|---|---|
| | | | | | | | Pipe Stop | Tank - |
| Pump | | Run | Run | Stop | Stop | Run | - | - |
| Optical sensor | | Detected | Undetected | - | - | - | - | - |
| Valve | CV1 | O | O | O | ● | O | O | △ |
| | V1 | O | O | O | ● | O | O | ● |
| | V2 | ● | ● | O | ● | ● | O | △ |
| | V3 | O | ● | ● | ● | ● | ● | △ |
| | V4 | ● | O | ● | ● | O | ● | △ |
| | V5 | ● | ● | ● | ● | ● | O | △ |
| | V6 | ● | ● | ● | ● | ● | ● | O |
| | D | O | O | ● | ● | ● | O | ● |
| | 42A | ● | ● | ● | ● | O | ● | ● |
| | 42B | ● | ● | O | ● | ● | ● | ● |
| | 42C | ● | ● | ● | O | ● | ● | ● |
| Air pump | | Run | Run | Run(increase) | Stop | Run | Stop | Stop |

Legend:
○ Open
● Closed
△ Event-driven operation

FIG.8A
FIG.8D
FIG.8C
FIG.8B
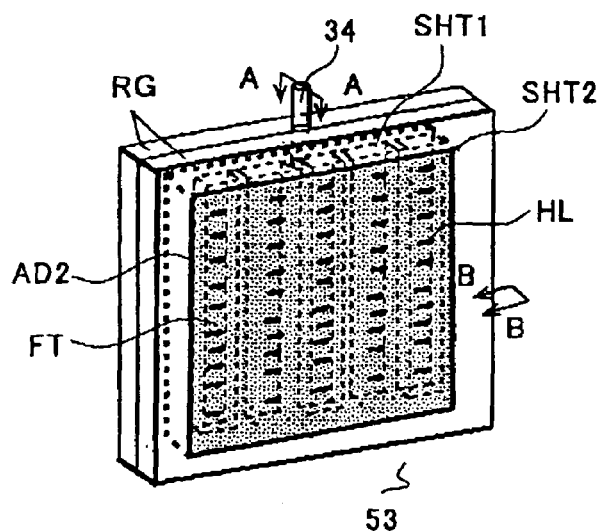
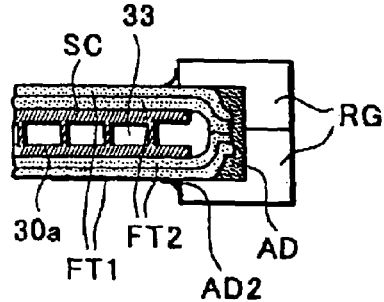
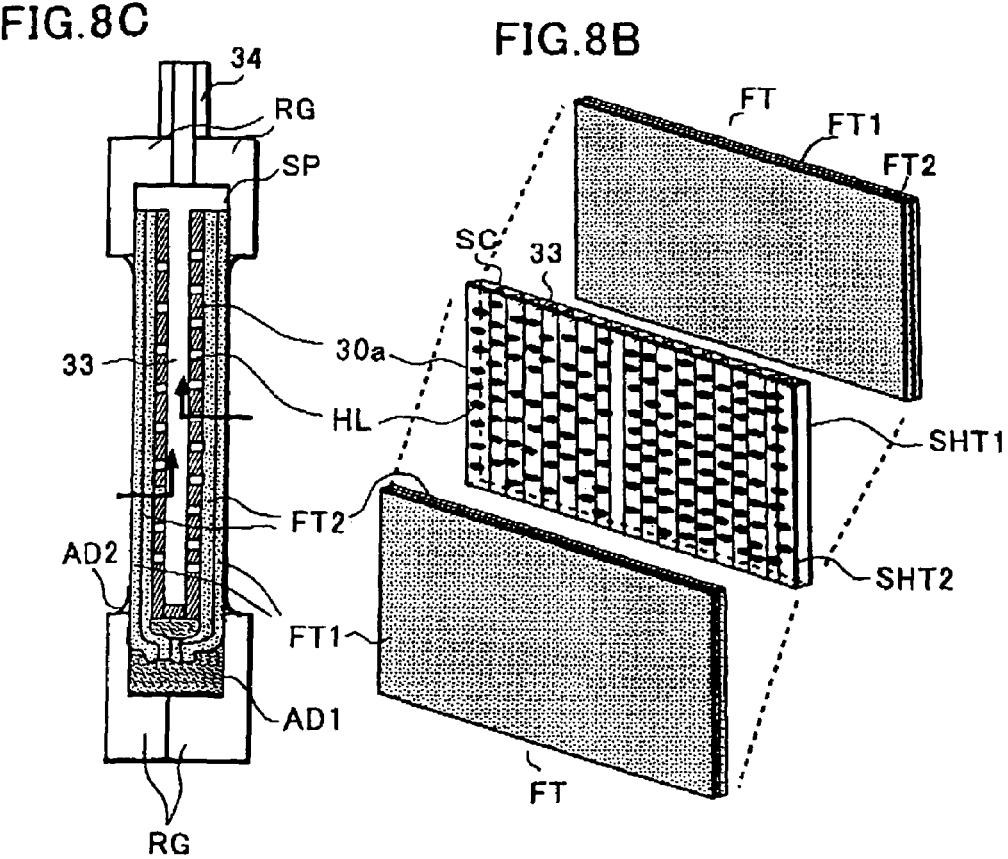

FILTRATION APPARATUS

CROSS REFERENCE TO RELATED APPLICATIONS

This application is a divisional of Ser. No. 10/831,585, filed Apr. 23, 2004.

This application claims the benefit of priority to Japanese Patent Applications Nos. 2003-122583, 2003-122584, 2003-122585 and 2003-122586 filed on Apr. 25, 2003, contents thereof being hereby incorporated by reference.

FIELD OF THE INVENTION

The present invention relates to a filtration apparatus, and more particularly to a filtration apparatus which is easy to maintain and manage and which enables preservation of filtration characteristics.

DESCRIPTION OF THE BACKGROUND ART

At present, companies are faced with very important and challenging ecological issues such as reducing industrial waste, sorting out industrial waste and recycling or avoiding discharge of industrial waste into the nature. One type of industrial waste comprises various fluids containing contaminants.

These fluids have different denominations, such as for instance sewage water, drainage, effluent, etc., but in the description to follow, fluids, like for example water, chemicals, etc. comprising materials which are contaminants are called wastewater. Such wastewater is filtered using very expensive filtration apparatuses to remove the contaminants therein. The resulted clean water is recycled, whereas the separated contaminants or the residues which could not be filtered are disposed of as industrial waste. In particular, water is filtered to a level of purity which meets the environmental standards and is then discharged into the nature, in rivers, seas, or the like, or is otherwise recycled.

However, the usage of these filtration apparatuses is extremely difficult and becomes an environmental issue in itself due to a high running cost and equipment cost, etc. of the filtration process, etc.

As can be understood from the above, technology and techniques for wastewater treatment raise an important issue in terms of environmental pollution and recycling and therefore a system with a low initial cost and low running cost is promptly required.

An example of wastewater treatment in the semiconductor field is described in the following. When a plate-like metal, semiconductor or ceramic, etc. is polished or ground, a liquid such as water, etc. is showered on the polishing (grinding) jig and the plate due to considerations such as prevention of temperature rise of the polishing (grinding) jig, etc. caused by friction, improvement of lubricating property, prevention of polishing waste or cutting waste adherence, etc. to the plate.

In more detail, pure water is caused to flow during the process of dicing or backgrinding a semiconductor wafer comprising a plate-like semiconductor material. In a dicing apparatus, a flow of pure water is provided on the semiconductor wafer or pure water is showered by means of a discharge nozzle such that the blade is exposed to the pure water in order to prevent a rise in the temperature of the dicing blade and prevent adherence of dicing waste to wafer. Pure water is also used due to similar considerations in a process of thinning the wafer by backgrinding.

The wastewater containing polishing waste or grinding waste discharged from the above dicing apparatus or back-grinding apparatus is filtered and the clean water obtained thereby is returned into nature or is recycled, whereas the concentrated wastewater is recovered.

At present, two methods are employed in the semiconductor manufacturing process for the treatment of wastewater containing contaminants (waste) comprising mainly Si: the flocculation method and a method combining filter filtration and a centrifugal separator.

In the flocculation method, PAC (polychlorinated aluminum) or $Al_2(SO_4)_3$ (aluminum sulfate), or the like is mixed in the wastewater as flocculant to generate a reaction with the Si and filtration is carried out by removing the reaction.

In the method combining filter filtration and a centrifugal separator, after the wastewater is filtered, the concentrated wastewater is fed to the centrifugal separator and silicon waste is collected as sludge, whereas the clean water resulted from the filtration process is discharged into the nature or is recycled.

For instance, wastewater generated in the dicing process is collected in a raw water tank 201 and is fed to a filtration apparatus 203 via pump 202 as shown in FIG. 16. The filtration apparatus 203 is provided with a ceramic and an organic filter F and the water filtered thereby is fed to a recycled water tank 205 via a pipe 204, to be further recycled or discharged into the nature.

The filtration apparatus 203 is periodically washed due to clogging of the filter F. The filter F is back-washed with the water inside the recycled water tank 205 by closing valve B1 provided in the raw water tank 201 and opening valve B3 and valve B2 which feed washing water from the raw water tank 201. The wastewater thus generated and having a high concentration of Si waste mixed therein is returned to the raw water tank 201. The concentrated water in the concentrated water tank 206 is fed to the centrifugal separator 209 by means of a pump 208 and the centrifugal separator 209 separates the sludge and the separate liquid. The sludge comprising Si waste is collected in a sludge recovery tank 210, whereas the separate liquid is collected in a separate liquid tank 211. The wastewater in the separate liquid tank 211 containing the separate liquid is fed to the raw water tank 201 by means of a pump 212.

These methods are also employed when collecting waste generated during polishing and grinding of, for instance, solids mainly comprising metal materials such as Cu, Fe, Al, etc., or solids comprising inorganic materials such as plates, ceramic, etc., or plates, etc.

On the one hand, the CMP (Chemical-Mechanical Polishing) method has emerged as a novel semiconductor process technology. The CMP technology was brought about by the achievement of plane insulating film devices and by the implementation of embedded structures comprising a material different from the material of the substrate.

Plane insulating film devices are formed by forming a highly accurate micropattern using the lithography technology. Together with the Si wafer attachment technology, etc., this achievement provides the potential for the implementation of three-dimensional ICs.

With respect to the implementation of embedded structures, conventionally, a technology is used where tungsten (W) is embedded in the multilayer wiring of an IC. Here, W is embedded in the grooves of an interlayer film by the CVD method and a surface thereof is planarized by etch-back. However, recently, the CMP method is used in the planarization process. The embedding technology can be applied in the Damascene process and elements separation. The CMP technology and its applications are described in detail in "CMP Science" published by Science Forum.

Next, the mechanism of the CMP technology is described. As shown in FIG. 17, a semiconductor wafer 252 is placed on an abrasive cloth 251 provided on a rotating table 250 and the uneven surface of the wafer 252 is leveled by lapping, polishing and chemical etching while causing a polishing material (slurry) 253 to flow. Planarization is obtained by a mechanical polishing process between a chemical reaction of a solvent included in the polishing material 253 and a polishing abrasive coating included in the abrasive cloth and the polishing material. Foamed polyurethane, non-woven cloth, etc. can be used as the abrasive cloth 251, whereas the polishing material is a material comprising polishing abrasive coating such as silica, alumina, etc. mixed with water comprising a pH adjuster, and is generally known as slurry. Lapping is carried out by applying a constant pressure while rotating the wafer 252 in the abrasive coat and causing the slurry 253 to flow. A dresser 254 has the function of maintaining the polishing capabilities of the abrasive cloth 251 and always keeps a surface of the abrasive cloth 251 in a dressed state. Motors 202, 208 and 212 and belts 255, 256 and 257 are also provided.

The above-described mechanism is constructed as a system, as shown in FIG. 18. This system can be divided in a wafer cassette, loading/unloading station 260, a wafer reprint mechanical section 261, a polishing mechanical section 262 as described with reference to FIG. 17, a wafer washing mechanical section 263 and a control system controlling all these elements.

First, the cassette 264 comprising wafers is placed in the wafer cassette loading/unloading station 260 and a wafer inside the cassette 264 is removed. Next, the wafer reprint mechanical section 261 holds the wafer with, for instance, a manipulator 265 and places it on the rotating table 250 provided in the polishing mechanical section 262. Planarization of the wafer is carried out using the CMP technology. When the planarization process is finished, the wafer is fed to the washing mechanical section 263 by the manipulator 266 and is washed in order to wash away the slurry. The washed wafer is housed in a wafer cassette 266.

The amount of slurry used in one process is, for instance, around 500 cc to 1 liter/wafer. Also, pure water is caused to flow in the polishing mechanical section 262 and wafer washing mechanical section 263. Thus, the total amount of wastewater, at drainage, discharged in one planarization process is around 5 liters to 10 liters/wafer. For example, in case of a 3-layered metal, the planarization process is carried out about 7 times for metal planarization and interlayer dielectric film planarization, accordingly, the wastewater amount discharged until one wafer is completed is 5 to 10 liters multiplied by 7. Thus, it can be understood that by using the CMP apparatus, the amount of slurry diluted by pure water and discharged is quite large. The wastewater is then treated by the flocculation method.

However, with the flocculation method, chemicals are injected as flocculants. Nevertheless, it is extremely difficult to specify the amount of chemicals that fully react and a large amount of chemicals which do not react is left. By contrast, if the amount of chemicals is low, not all of the contaminants are coagulated and are left un-separated. In particular, if the amount of the chemicals is large, chemicals are left in the clear supernatant liquid and therefore, because chemicals remain in the filtered liquid, reuse thereof is impossible at when further chemical reactions need to be carried out.

Flocks which are reactions of the chemicals and contaminants are generated by the suspension of algae. The formation of flocks requires very strict pH conditions, an agitator, a pH measurement device, a flocculating agent implantation device, and a controlling device, for controlling all of these elements, etc. Also, in order to stabilize and cause precipitation of the flocks, a huge precipitation tank is required. For instance, for a wastewater processing capability of 3 $m^3/1$ h, a tank having about 3 meters in diameter and about 4 meters in depth (around 15 tones) is needed, so that the entire system becomes a huge system requiring a compound of about 11 meters by 11 meters.

However, there are also flocks that keep floating without precipitating in the precipitation tank. It is therefore possible that they are discharged to the exterior and recovery thereof is very difficult. Due to size considerations, initial cost of this system is expensive, reuse of water is difficult and the running cost generated by the use of chemicals is very expensive.

In a method combining filter filtration (5 $m^3/1$ h) and a centrifugal separator, as shown in FIG. 16, a filter F (it is called a UF module and comprises polysulfone fiber or ceramic filter) is used in the filtration apparatus 203 which enables reuse of water. Four filters F are attached in the filtration apparatus 203, one filter costing around 50000 yen and having a life span of no more than a year. Due to the fact that filter F is a pressurized filtration method, the filter clogs and the load to the motor of pump 202 increases thus requiring a high-capacity pump 202. Moreover, ⅔ of the wastewater passing through the filter F are returned into the raw water tank 201 and because the wastewater containing removables is supplied using pump 202, the inner walls of the pump 202 are chipped and the life span of the pump 202 is extremely short.

To summarize, running cost, including extremely high power consumption by the motor, high costs associated with replacement of the pump P and filter F, becomes extremely high.

Moreover, with the CMP method, in the dicing process, a very large amount of wastewater is discharged. Colloid slurry is distributed in the fluid, but due to a Brownian motion, they do not precipitate. Particles of the abrasive coating mixed in the slurry have a diameter of 10 thru 200 nm, in other words, they are very fine particles. Consequently, when the slurry comprising very fine abrasive coating is filtered through the filter, particles enter the holes provided in the filter causing clogging. The filter clogs very frequently so that it is impossible to filter a large amount of wastewater.

As can be understood from the above description, in order to remove as much as possible all materials that may cause damage to the environment and to recycle filtered fluid and removables separated in the filtration process, the wastewater filtration system becomes a huge system due to various additional apparatuses, thus triggering extremely high initial cost and running cost. Accordingly, wastewater treatment apparatuses until now, could not be easily installed and used for wastewater treatment.

When using a self-generated film (pre-coat filter) to filter the wastewater, control of the pump carrying out filtration is very difficult.

Furthermore, in order to recover the removables precipitated at the bottom of the tank, filtration process is temporarily halted in order to discharge the fluid inside the tank. This led to a reduction of filtration efficiency.

Also, when filtration is carried out in a filtration apparatus having a self-generated filter, there is no appropriate method of removing the self-generated film which clogged.

SUMMARY OF THE INVENTION

A first aspect of the present invention thereby provides a tank for housing a fluid containing removables, a filter apparatus for filtering the fluid, an air diffuser located under the filter apparatus and generating air bubbles inside the fluid, an air pump for supplying gas via an air pipe connected to the air diffuser, wherein the air pipe is provided with an adjustment valve regulated in advance so that a predetermined amount of gas is caused to pass, and a stop valve for blocking or releasing the gas that passes inside the air pipe.

A further aspect of the present invention provides a tank for housing a fluid containing colloidal removables, a filter apparatus formed of a first filter immersed inside the tank and a second filter comprising a gel film adhered to a surface of the first film, an air diffuser located under the filter apparatus and generating air bubbles inside the fluid, an air pump for supplying gas via an air pipe connected to the air diffuser, wherein the air pipe is provided with an adjustment valve regulated in advance so that a predetermined amount of gas is caused to pass, and a stop valve for blocking or releasing the gas that passes inside the air pipe.

The present invention enables to set the amount of gas generated from the air pipe to a desired value by using in combination the adjustment valve having the amount of gas passing therethrough regulated in advance and the stop valve for blocking of releasing the gas flow.

Another aspect of the present invention provides a tank for housing a fluid containing removables, a filter apparatus formed of a first filter immersed inside the tank and a second filter comprising removables deposited on a surface of the first filter, a pump connected to the filter apparatus via a pipe, wherein the second filter is formed by the passage of the fluid through the first filter by applying a suction pressure of the pump and the filter apparatus thus having the second filter formed filters the fluid by causing the fluid to pass by applying a suction pressure of the pump, wherein the suction pressure of the pump in a process of forming the second filter is larger than in a process of filtering the fluid.

A further aspect of the present invention provides a tank for housing a fluid containing colloidal removables, a filter apparatus formed of a first filter immersed inside the tank and a second filter comprising a gel film adhered to a surface of the first layer, a pump connected to the filter apparatus via a pipe, wherein the second filter is formed by the passage of the fluid through the first filter by applying a suction pressure of the pump and the filter apparatus thus having the second filter formed filters the fluid by causing the fluid to pass by applying a suction pressure of the pump, wherein the suction pressure of the pump in the process of forming the second filter is larger than in the process of filtering the fluid.

Accordingly, the present invention enables a smooth formation of a second filter which is a self-generated film and a smooth filtration by means of the second filter by regulating the suction pressure of a pump.

Another aspect of the present invention provides a tank for housing a fluid containing removables, a filter apparatus immersed inside the tank, a recovery tank for removables precipitation which communicates with a lower part of the tank via a valve, wherein the recovery tank is detachable from the tank by closing the valve and detaching the recovery tank from the tank to thus recover removables precipitated in the recovery tank.

A further aspect of the present invention provides a tank for housing a fluid containing colloidal removables, a filter apparatus formed of a first filter immersed inside the tank and a second filter comprising a gel film adhered to a surface of the first filter, a recovery tank for removables precipitation which communicates with a lower part of the tank via a valve, wherein the recovery tank is detachable from the tank by closing the valve and detaching the recovery tank from the tank to thus recover removables precipitated in the recovery tank.

Accordingly, in the present invention, a detachable recovery tank is provided in lower part of a tank carrying out a filtration process to enable recovery of the precipitated removables by simply detaching the recovery tank from the tank. It is also possible to recover the precipitated removables without halting the filtration operation.

Another aspect of the present invention provides a tank for housing a fluid containing removables, a filter apparatus formed of a first filter immersed inside the tank and a second filter comprising removables deposited on a surface of the first filter, a pump connected to the filter apparatus via a pipe, a peel cistern connected to the pipe and storing filtered water filtered by the filter apparatus, wherein the peel cistern is located at a level above the fluid level of the fluid contained in the tank and when the second filter clogs and the flow rate of the filtered water decreases, the second filter is removed by causing the filtered water accumulated in the peel cistern to flow back to the filter apparatus via the pipe.

A further aspect of the present invention provides a tank for housing a fluid containing colloidal removables, a filter apparatus formed of a first filter immersed inside the tank and a second filter comprising a gel film adhered to a surface of the first film, a pump connected to the filter apparatus via a pipe, a peel cistern connected to the pipe and storing filtered water filtered by the filter apparatus, wherein the peel cistern is located at a level above the fluid level of the fluid contained in the tank and when the second filter clogs and the flow rate of the filtered water decreases, the gelatinous second filter is removed by causing the filtered water accumulated in the peel cistern to flow back in the filter apparatus via the pipe.

Accordingly, when the second filter which is a self-generated film clogs, the second filter is removed by causing the filtered water accumulated in the peel cistern to flow back to the filter apparatus. Thus, the present structure enables the removal of the second filter by a very simple structure.

Typically, in order to remove particles equal to or smaller than 200 nm like the abrasive coating contained in CMP slurry, a filter film comprising holes smaller in size than the size of the particles is generally adopted. However, in the present invention, a gel film comprising removables is used as a filter and the numerous spaces formed in the filter are used as passages for the fluid. Here, the filter itself is an aggregation of removables particles and filtration characteristics thereof can be preserved by removing the removables causing the clogging from the filter. Even if the filter comprising the gel film clogs after prolonged filtration, the filter is regenerated and filtration can be continued for a long time.

With this invention, an air pipe connecting an air diffuser 54 that generates air bubbles inside raw water with an air pump 55 is provided with an adjustment valve and a stop valve. The adjustment valve is configured so that a desired predetermined amount of gas is caused to pass therethrough. Accordingly, the desired amount of gas can be provided to the air diffuser by opening or closing the stop valve.

The air pipe is provided with a plurality of paths, each of the paths being provided with an adjustment valve and a stop valve, respectively, for allowing a different amount of gas to pass therethrough. Thus, by opening only one of the stop valves and closing the other stop valves, a desired amount of gas can be provided to a raw water tank.

In a filtration apparatus where filtration is carried out by using a second filter which is a self-generated film, filtered water from a filter apparatus 53 is removed by applying the suction pressure of a pump that has an adjustable motor. In a process of forming the second filter which is a self-generating film, the motor is caused to rotate at a high speed, whereas in a process of filtration using the self-generated film thus formed, the motor can be caused to rotate at a low speed. Thus, in the process of forming the second filter, a second filter can be formed promptly, whereas in the process of filtration, destruction of the second filter by applying an excessive suction pressure is prevented.

Furthermore, in case the second filter is a gelatinous self-generating film, the gel can be kept at a desired degree of swelling by causing the motor to rotate at a low speed during the filtration process. Also, the gelatinous second filter can be prevented from entering in the holes provided in the first filter.

Removables concentrated in the filtration process can be precipitated in a recovery tank 15 which communicates with a lower part of a raw water tank 50 where filtration is carried out. Moreover, the recovery tank 15 is detachable from the filtration apparatus thus enabling recovery of the removables precipitated inside the recovery tank 15 while he filtration process is ongoing.

The raw water tank 50 is formed of a material having excellent water-shedding qualities and thus, the gelatinous removables consolidate by a tensile force of a surface thereof and are moved into the recovery tank 15. The gelatinous removables can be prevented from adhering to inner walls of the raw water tank 50.

The filtered water filtered by the filter apparatus 53 is accumulated in a peel cistern 70 and when the second filter which is a self-generated film clogs, the second filter is removed by causing the filtered water from the peel cistern 70 to flow back. A mechanism is thus provided for removing the second filter without the need for another pump, etc.

In order to remove microparticles mainly equal to or smaller than 0.15 μm like the abrasive coating contained in CMP slurry, a filter film comprising holes smaller in size than the size of the microparticles is generally adopted. However, the filtration apparatus hereby provided forms a gel film filter comprising removables of a colloidal solution and filtration is carried out without the need of a filter film comprising mainly holes equal to or smaller than 0.15 μm.

BRIEF DESCRIPTION OF THE DRAWINGS

FIG. 6 illustrates the operation of a concrete filtration apparatus according to an embodiment of the invention.

FIG. 8 shows a concrete filter apparatus according to an embodiment of the invention.

DETAILED DESCRIPTION OF THE INVENTION

FIRST EMBODIMENT

Figure 1:
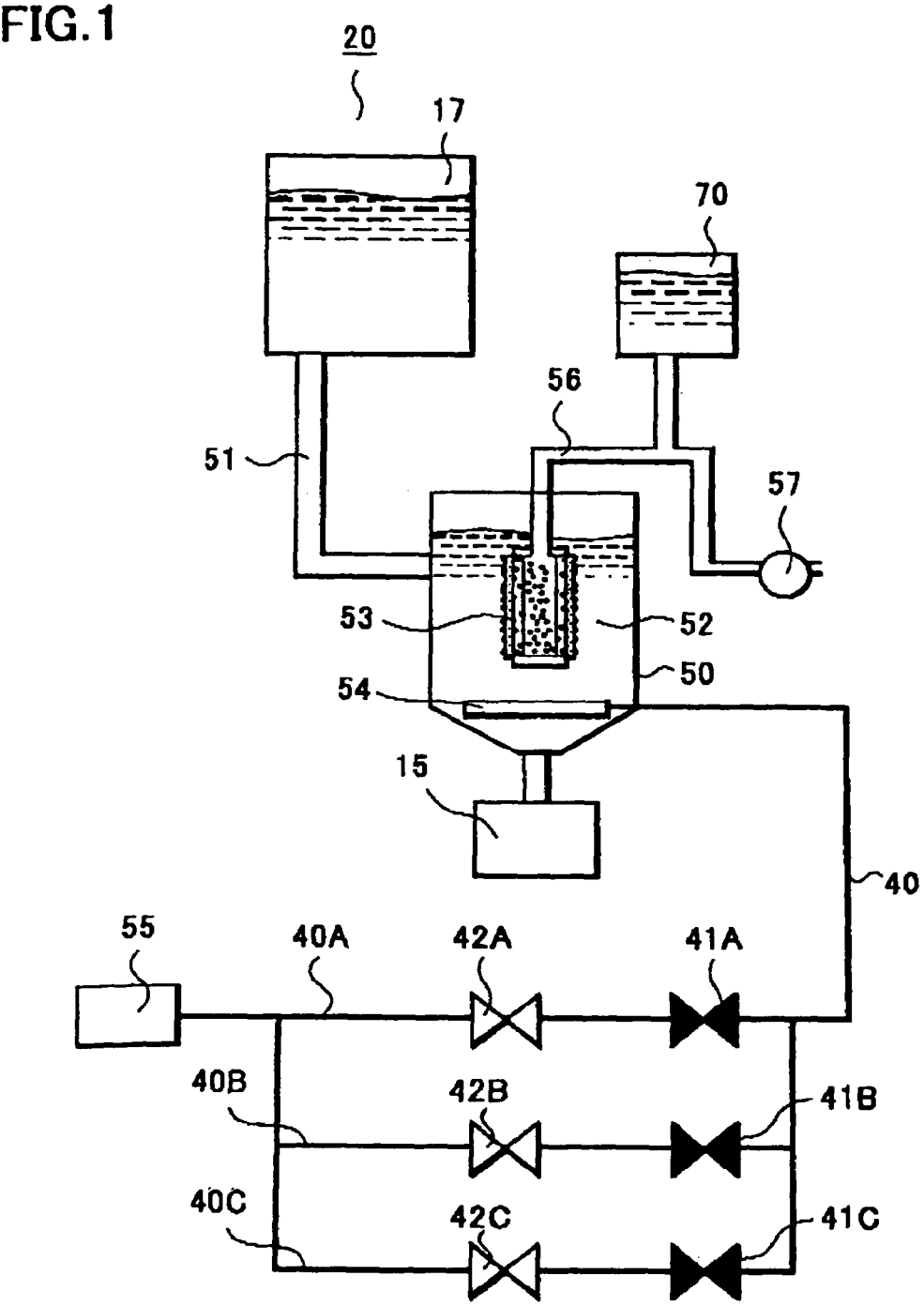
FIG. 1 shows a filtration apparatus according to an embodiment of the invention.

Configuration, etc. of a filtration apparatus 20 according to a first embodiment of the invention is described referring to FIG. 1. The filtration apparatus 20 comprises a tank 50 for housing a fluid comprising removables, a filter apparatus 53 for filtering the fluid, an air diffuser 54 as an air diffusion means, located at a lower part of the filter apparatus 53 and generating bubbles inside the fluid, an air pump 55 connected to the air diffuser 54 via an air pipe 40 and supplying gas, wherein the air pipe 40 is provided with an adjustment valve 41 regulated in advance so that a predetermined amount of gas is caused to pass, and a stop valve 42 for blocking or releasing the gas that passes inside the air pipe 40. A more detailed description of the configuration of the filtration apparatus 20 is next provided.

A raw water tank 50 as shown in FIG. 1 is provided in an upper part thereof with a pipe 51 as means for supplying wastewater. The pipe 51 supplies the fluid containing removables to the tank 50. For instance, to better describe this using semiconductor-related terms, it is the pipe that supplies wastewater (raw water) containing removables of a colloidal solution which flows from dicing apparatuses, backgrinding apparatuses, mirror polishing apparatuses or CMP apparatuses. A further description is next given of the wastewater as wastewater comprising abrasive coating flowing from the CMP apparatus and waste resulted from polishing or grinding by the abrasive coating. As shown in FIG. 1, the fluid temporarily stored in a wastewater reservoir 17 may also be supplied to the raw water tank 50 via the pipe 51.

A plurality of filter apparatuses 53 comprising a second filter are placed in the raw water 52 accumulated in the raw water tank 50. An air diffuser 54, similar for instance to a bubbling apparatus used in fish aquariums and having small holes opened in a pipe thereof, is placed at a lower part of the filter apparatus 53 and the position thereof is adjusted so that air bubbles generated therefrom can pass through a surface of the filter apparatus 53. The air diffuser 54 is located along the entire bottom of the filter apparatus 53 so that air bubbles can be uniformly supplied in the entire filter apparatus 53. An air pump 55 and the air diffuser 54 are connected via an air pipe 40.

The raw water 52 supplied from the pipe 51 is accumulated in the raw water tank 50 and is filtered by the filter apparatus 53. The bubbles pass through a surface of a second filter 2 that adheres to the filter apparatus 53 thus generating a parallel flow by the climbing power and the burst of the air bubbles, which moves the gelatinized removables adhered to the second filter 2 so that they adhere uniformly to the entire filter apparatus 53, thus preserving filtration capabilities.

The air pipe 40 connecting the air pump 55 and the air diffuser 54 is provided with an adjustment valve 41 and a stop valve 42. The adjustment valve 41 is configured so that a desired amount of gas is allowed to pass therethrough, for example, a needle valve, etc. can be adopted as an adjustment valve. The stop valve 42 controls releasing and blocking of the gas flowing inside the air pipe 40. More concretely, a valve, etc. using for instance solenoid, etc., can be employed as the stop valve 42. A desired amount of gas can be supplied to the air diffuser by using in combination the adjustment valve 41A and the stop valve 42A, that is, open only stop valve 42A while fixing an output of the air pump 55.

Furthermore, a plurality of parallel paths branch off from the air pipe 40. In more detail, a first path 40A, a second path 40B and a third path 40C parallel to each other branch off from the air pipe 40. Each of these paths is provided with adjustment valve 41 and stop valve 42, respectively.

A first adjustment valve 41A and a first stop valve 42A are provided in the first path 40A. The first adjustment valve 41A is regulated so that an appropriate amount of gas is allowed to pass during the filtration operation of the filter apparatus 53. During the filtration process using the filter apparatus 53 or during the formation process of the gelatinous second filter, the first stop valve 24A is opened. Also, when the first stop valve 42A is in an open state, the second stop valve 42B and the third stop valve 42C are all in a close state. It is thereby possible, in the filtration process, to supply a moderate amount of gas from the air diffuser 54 via the first adjustment valve 41A thus regulated. Accordingly, the raw water in the raw water tank 50 is mixed by the air bubbles rising from the air diffuser 54, thus enabling a smooth filtration.

The second adjustment valve 41B and the second stop valve 42B are provided in the second path 40B. The second adjustment valve 41B is set to allow the passage of a larger amount of gas than the first adjustment valve 41A. The second stop valve 42B is opened during the process of removing (regeneration process) the gelatinous second filter from the first filter, both filters forming the filter apparatus 53. The second filter can be removed by supplying a large amount of gas from the air diffuser 54 into the raw water. When the second stop valve 42B is in an open state, the first stop valve 42A and the third stop valve 42C are in a close state.

The third adjustment valve 41C and the third stop valve 42C are provided in the third path 40C. The third adjustment valve 41C is set to allow the passage of a smaller amount of gas than the first adjustment valve 41A and the second adjustment valve 41B. The third stop valve 42C is opened when the operation of the entire filtration apparatus 20 is halted. When the third stop valve 42C is in an open state, the first stop valve 42A and the second stop valve 42B are in a close state. Clogging of the air diffuser 54 can be prevented by maintaining the third stop valve 42C in an open state when the filtration operation of the entire filtration apparatus is halted.

SECOND EMBODIMENT

Configuration of a filtration apparatus according to a second embodiment of the invention is basically the same as that described in the first embodiment, consequently, description is given only of the differences therebetween.

Figure 2A:
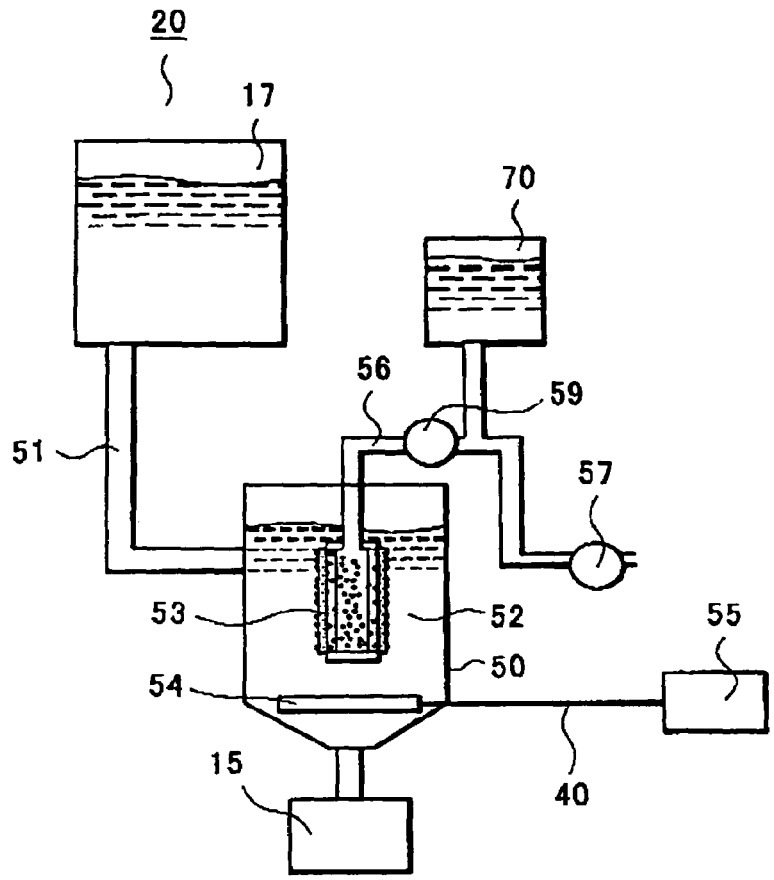
FIG. 2 shows a filtration apparatus according to an embodiment of the invention.
Figure 2B:
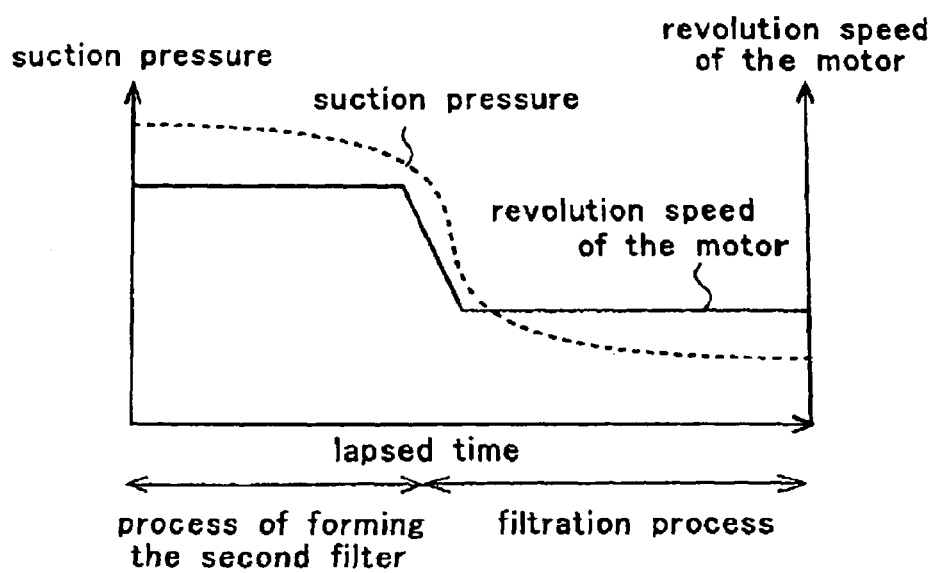

FIG. 2A is a schematic diagram of a filtration apparatus 20 according to a second embodiment of the present invention and FIG. 2B is a characteristics diagram showing variation in time of revolution speed of the motor and the suction pressure inside a pipe 56.

The filtration apparatus 20 shown in FIG. 2A comprises a raw water tank 50 for housing a fluid containing removables, a filter apparatus 53 comprising a first filter immersed inside the raw water tank 50 and a second filter comprising removables deposited on a surface of the first filter, a pump 57 connected to the filter apparatus 53 via a pipe 56, wherein the second filter is formed by the passage of the fluid through the first filter by applying a suction pressure from the pump 57 and the filter apparatus 53 thus having the second filter formed, filters the fluid by causing the fluid to pass by applying a suction pressure from the pump 57, wherein the suction pressure of the pump 57 in the process of forming the second filter is larger than in the process of filtering the fluid.

The pump 57 is coupled with the filter apparatus 53 via the pipe 56 so that the fluid filtered in the filter apparatus 53 is discharged to the exterior by the suction power generated by the pump 57. In the process of forming the second filter or in case the filtered fluid does not have the desired transparency, the fluid discharged from the filter apparatus 53 is returned to the raw water tank 50. In other words, the filtration apparatus 20 according to this embodiment has a process allowing circulation of filtered water. A barometer 59 for detecting the pressure inside the pipe 56 is provided therein. The suction pressure of the pump is controlled by controlling the revolutions of the motor provided in the pipe, in response to the pressure inside the pipe 56 which is measured by means of the barometer 59. A peel cistern 70 for temporarily storing the filtered liquid communicates with the pipe 56.

Devices comprising an alternating-current motor having a revolution speed thereof controlled by an inverter circuit, or a direct-current motor having a revolution speed thereof controlled by a voltage applied thereto, etc. can be employed as the pump 57. The use of a motor having a controllable revolution speed enables variation of the suction pressure applied to the filter apparatus 53 in the second filter formation process and in the filtration process. Particularly, in the present embodiment, the fluid is filtered using the gel film formed on the surface of the first filter. The use of a motor having a controllable revolution speed enables prevention of the second filter destruction which may be caused by the gel entering the holes provided in the first filter. A more detailed description of the gelatinous second filter is provided later.

Means other than variation of the motor revolution speed described above can be used as adjustment means for the suction pressure applied to the filter apparatus 53. For instance, the suction pressure applied to the filter apparatus 53 can be adjusted by fixing the revolution speed of the motor that drives the pump 57 and providing a release valve in the pipe 56. More concretely, the suction pressure can be decreased by opening the release valve or can be increased by closing the release valve. The suction pressure applied to the filter apparatus 53 can also be varied by moving the position of the pump 57 on a vertical direction.

Next, the relationship between the suction pressure applied to the filter apparatus 53 and the revolution speed of the motor provided in the pump 55 is described with reference to FIG. 2B. The abscissa axis shows the lapsed time, whereas the vertical axis on the left shows the suction pressure applied to the filter apparatus 53, in other words, the increase in negative pressure. The vertical axis on the right shows the revolution speed of the motor operating the pump 57. The broken line shows the variation of suction pressure whereas the continuous line shows variation of the motor revolution speed.

The filter apparatus 53 is immersed in the raw water 52 and by operating the pump 57, a second filter which is a self-generated film is formed on a surface of the first filter. This is the process in which the second filter is formed. In this process, the revolution speed of the motor driving the pump 57 is increased as much as possible in order to allow a prompt formation of the second filter. Also, here, the discharged filtered water may be returned into the raw water tank 50.

In the above process, the second filter which is a self-generated filter is gradually formed on the surface of the first filter of the filter apparatus 53. The second filter comprises removables contained in the fluid and is provided with very fine holes compared to the holes provided in the first filter. Along with the formation of the second filter, the suction pressure gradually decreases. This suction pressure is monitored by the barometer 59.

When the suction pressure has reached a predetermined value, it is determined that the formation of the second filter is complete and the filtration process is started. The revolution speed of the motor in the filtration process is slower than the revolution speed in above process where the second filter is formed. Accordingly, the suction pressure can be set to be equal or less than a predetermined value and destruction of the second filter by applying an excessive suction pressure thereto can be prevented.

Filtration capabilities of the second filter decrease with the progress of the filtration process. The second filter having decreased filtration capabilities is removed by causing the filtered water from the peel cistern 70 to flow back into the filter apparatus 53. The filtered water which is caused to flow back into the filter apparatus 53 is then returned into the peel cistern 70 by operating the pump 57. The suction pressure of the pump 57 at that time is set to be larger compared to that during the filtration process.

When the filtration operation is completed, before halting operation of the filtration apparatus 20, the suction pressure is reduced compared to that during the filtration process and the pump is thus operated for a predetermined period of time. The load to the filtration apparatus 20 when operation thereof is restarted can thus be reduced.

THIRD EMBODIMENT

Configuration of a filtration apparatus according to a third embodiment of the invention is basically the same as that described in the first embodiment, consequently, description is given only of the differences therebetween.

Figure 3A:
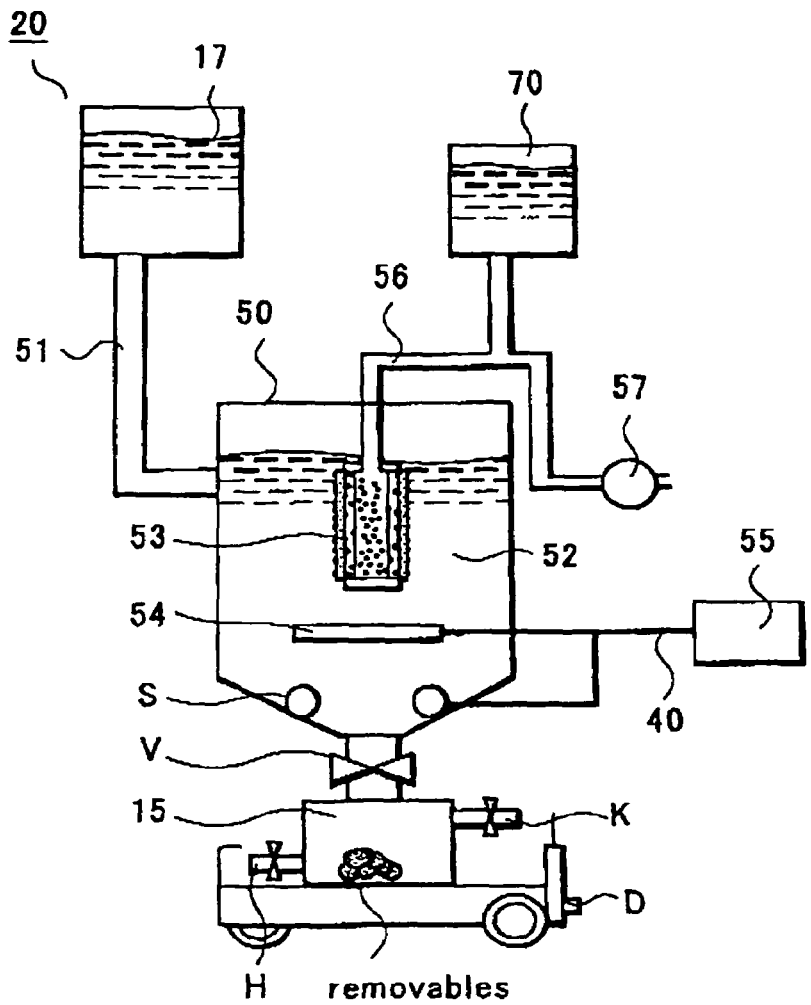
FIG. 3 shows a filtration apparatus according to an embodiment of the invention.
Figure 3B:
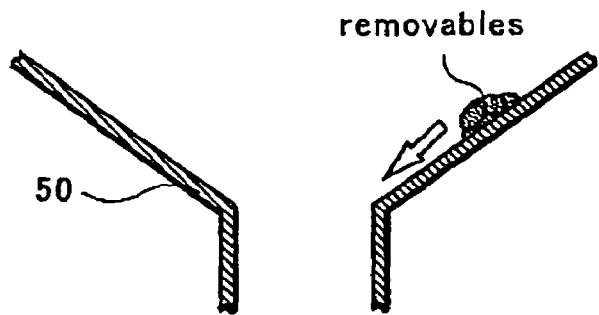

The configuration, etc. of a filtration apparatus 20 according to a third embodiment of the invention is described with reference to FIG. 3, where FIG. 3A is a schematic diagram of a filtration apparatus 20 and FIG. 3B is a cross-sectional enlarged view of a tapered lower part of a raw water tank 50.

The filtration apparatus 20 comprises a raw water tank 50 housing a fluid containing removables, a filter apparatus 53 immersed inside the raw water tank 50, a recovery tank 15 that communicates with a lower part of the raw water tank 50 via a valve V and where removables precipitate, wherein the recovery tank 15 is detachable from the raw water tank 50 and the removables precipitated in the recovery tank 15 are recovered by closing the valve V and separating the recovery tank 15 from the raw water tank 50.

The bottom of the raw water tank 50 is tapered and a lowermost part of the bottom communicates with the recovery tank 15. By forming the bottom of the raw water tank 50 to have a tapered shape, it is possible to efficiently move the removables precipitated therein into the recovery tank 15. It is preferable to employ resins such as polyvinyl chloride, etc. as the material of the raw water tank 50. The steeper the tapered inclination, the greater the efficiency in recovering the precipitated removables in the recovery tank 15. That is, the steeper the tapered inclination, the easier the removables move below the recovery tank 15 without adhering to the inner walls of the tapered parts of the raw water tank 50.

Air diffusers S are provided in the vicinity of the tapered inner walls of the raw water tank 50 and are connected with an air pump 55 via an air pipe 40. An air diffuser 54 has the function of generating air bubbles inside the raw water tank 52 and is operated during recovery of the removables accumulated in the recovery tank 15. The removables that adhere to the flat walls of the raw water tank 50 are removed by the air bubbles generated by the air diffuser 54 and are moved inside the raw water tank 50.

The recovery tank 15 communicates with a lower part of the raw water tank 50 via a valve V. That is, they communicate with each other when the valve V is in an open state and the communication thereinbetween is blocked when the valve V is in a close state.

A feed section K and a discharge section H are provided in the recovery tank 15, each being provided with a valve. The feed section K is used when a large amount of removables are precipitated inside the recovery tank 15. Air and fluid are supplied from the feed section K into the recovery tank 15 and the fluid containing removables can be discharged via the discharge section H. The valve provided in the discharge section H is opened to enable recovery of the fluid containing removables.

While the filter apparatus 53 is operating, the valve V is in an open state, so that when raw water 52 is supplied in the raw water tank 50, the inside of the recovery tank 15 is also filled with raw water 52. The recovery tank 15 may be formed of transparent materials so that the amount of removables precipitated inside the recovery tank 15 can be checked visually. The recovery tank 15 is detachable from the filtration apparatus 20.

The recovery tank 15 is mounted on a transfer vehicle D, similar, for instance, to a carriage having wheels.

An air pump 55 and the air diffuser 54 are connected via an air pipe 40. The recovery tank 15 communicating with a lower part of the raw water tank 50 is also provided.

The pump 57 is coupled with the filter apparatus 53 via pipe 56 so that the suction pressure generated by the pump 57 causes discharge of the fluid filtered by the filter apparatus 53 to the exterior.

The peel cistern 70 is coupled with the pipe 56 that extracts the filtered fluid from the filter apparatus 53 and stores it.

Next, operation of the filtration apparatus 20 according to this embodiment is described with reference to FIG. 3A and FIG. 3B.

First, raw water 52 is supplied into the raw water tank 50. Then, the second filter which is a self-generating film is formed on the filtration surface of the first filter by allowing the passage of raw water 52 into the filter apparatus 53 by applying a suction pressure from the pump 55. At this stage, the fluid that passes through the pipe 56 is not sufficiently filtered and may therefore be returned to raw water 52. At this stage, the valve V is in an open state so that raw water is also supplied in the recovery tank 15.

Next, the filtration process of the raw water 52 is started using the filter apparatus 53 which has a second filter 2 sufficiently formed thereon. At this stage, the filtered water obtained from the filter apparatus 53 has sufficient transparency and accordingly, it can be discharged to the exterior of the filtration apparatus 20. A part of the filtered water is stored in the peel cistern 70.

As the filtration process progresses, the second filter 2 gradually clogs and the amount of the filtered water that can be obtained is reduced. Next, a process of removing the second filter 2 is carried out. First, the pump 55 which applies a suction pressure to the filter apparatus 53 is halted. Then, the filtered water accumulated in the peel cistern 70 is caused to flow back to the filter apparatus 53 via the pump 56. The filtered water is caused to flow back into center (hollow area) 5 of the filter apparatus 53 so that the pressure acting from inside to outside is applied to the filter apparatus 53. This pressure removes the second filter 2 from the filter 1 and moves it downward. In order to facilitate the movement of the second filter, a large amount of air bubbles are generated from the air diffuser 54.

The removed second filter is moved to the recovery tank 15 via the bottom of the tapered raw water tank 50, as shown in FIG. 3B. As described, the raw water tank 50 is made of a material which has excellent water-shedding qualities. Accordingly, residues of the second filter comprising gelatinous removables solidify based on the surface tensile force. The so-solidified removables are moved to the recovery tank 15 sliding down the inner walls of the tapered raw water tank 50.

When a certain amount of removables are accumulated inside the recovery tank 15, they are recovered. First, air bubbles are generated from the air diffusers S to cause removables adhered to the inner walls of the raw water tank 50 to precipitate in the recovery tank 15. Next, the valve V is closed and the recovery tank 15 is detached from the raw water tank 50. The recovery tank 15 is then detached from the filtration apparatus 20 and raw water 52 accumulated therein and containing a large amount of removables is discharged. After that, the recovery tank 15 is attached to the filtration apparatus 20 and the valve V is closed so that raw water inside the raw water tank 50 is supplied inside the recovery tank 15 and the recovery tank 15 is once again filled with raw water 52. The transfer vehicle D is used to move the recovery tank 15 when the raw water inside the recovery tank 15 is discharged. The recovery operation of the removables can be carried out while the filter apparatus 53 is in operation.

FOURTH EMBODIMENT

Configuration of a filtration apparatus according to a fourth embodiment of the invention is basically the same as that described in the first embodiment, consequently, description is given only of the differences therebetween.

Figure 4A:
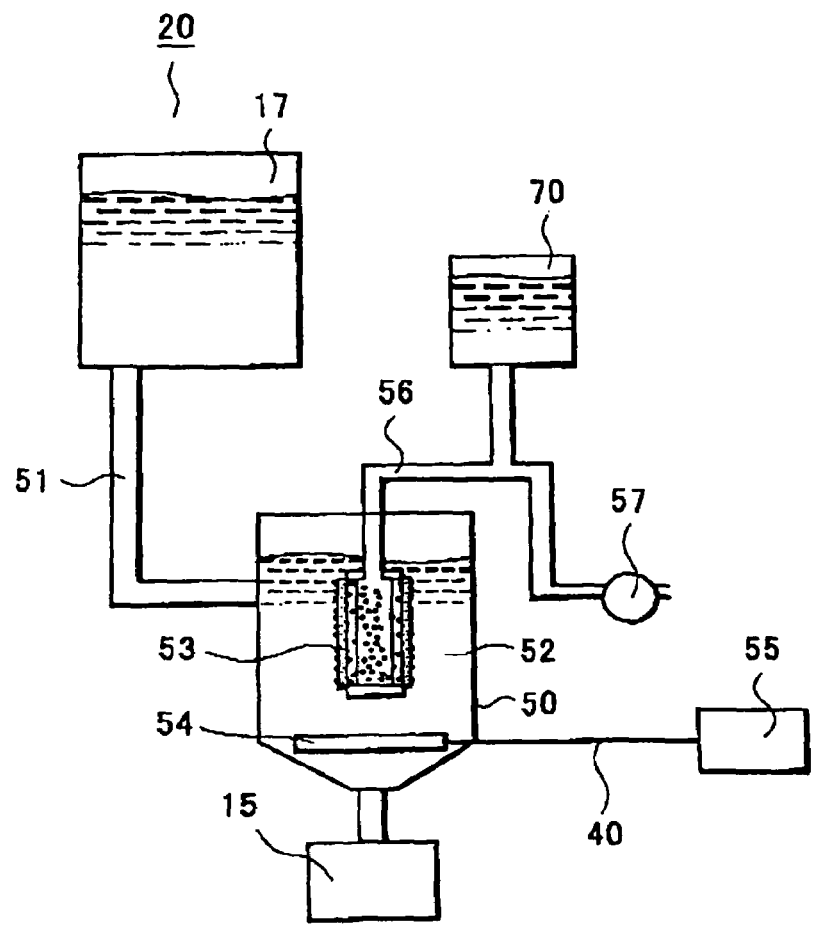
FIG. 4 shows a filtration apparatus according to an embodiment of the invention.
Figure 4B:
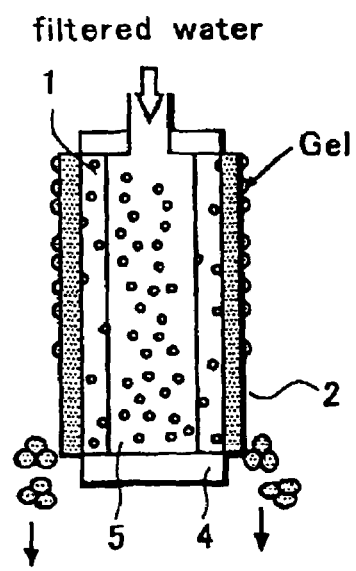

FIG. 4A is a schematic diagram of a filtration apparatus 20 according to this embodiment and FIG. 4B is a cross-sectional enlarged view of a filter apparatus.

The filtration apparatus 20 as shown in FIG. 4A comprises a raw water tank 50 housing a fluid containing removables, a recovery tank communicating with a lower part of the raw water tank 50, a filter apparatus 53 immersed inside the raw water tank 50 and comprising a first filter and a second filter containing removables deposited on a surface thereof, a pump 57 connected to the filter apparatus 53 via a pipe 56, a peel cistern 70 connected with the pipe 56 and storing filtered water filtered by the filter apparatus 53, wherein the peel cistern 70 is located at a level above the fluid level of the fluid contained in the raw water tank and when the second filter 2 clogs and the flow rate of the filtered water decreases, the second filter 2 is removed by causing the filtered water accumulated in the peel cistern 70 to flow back into the filter apparatus 53 via the pipe 56.

The filter apparatus 53 as shown in FIG. 4B comprises a flat membrane first filter 1 and a second filter 2 which is a self-generated film formed on a surface thereof. Here, a fluid containing very fine colloidal removables is employed as raw water so that the second filter 2 has a gelatinous aspect. A more detailed description of the filter apparatus 53 is given later.

Raw water 52 supplied from a pipe 51 is accumulated in the raw water tank 50 where it is filtered by the filter apparatus 53. A parallel flow which is generated by the climbing power and the bursting of air bubbles passing through a surface of the second filter 2 attached to the filter apparatus 53, moves the gelatinous removables adhered to the second filter, thus causing the removables to attach uniformly the entire filter apparatus 53 so that filtration capabilities thereof are maintained.

Pump 57 is connected to the filter apparatus 53 via the pipe 56. The fluid filtered in the filter apparatus 53 is discharged to the exterior by applying a suction pressure from the pump 57. The fluid removed from the filter apparatus 53 is returned into the raw water tank 50 during the second filter formation process or in case the filtered fluid does not have a desired degree of transparency. In other words, the filter apparatus 53 of this embodiment has a process of causing the filtered water to circulate. A cistern 70 for peel purposes temporarily storing filtered fluid is provided so as to communicate with the pope 56.

The peel cistern 70 is coupled to the pipe 56 which extracts filtered fluid from the filter apparatus 53 and stores it. The capacity of the peel cistern 70 is equal or more than the sum of the halves of the inner product of each filter apparatus 53 immersed in the raw water 52. More explicitly, in the process of removing the second filter, the capacity of the peel cistern 70 is configured so that a quantity of filtered water equal to or larger than half of the inner product of each filter apparatus 52 can be caused to flow back to each filter apparatus 53. The peel cistern 70 is located at a level above the fluid level of the raw water 52. The filtered fluid accumulated in the peel cistern 70 is caused to flow back inside the filter apparatus 53 by the hydraulic pressure generated by the positional relationship of the peel cistern 70 and the raw water 52.

Next, operation of the filtration apparatus 20 according to this embodiment is described with reference to FIG. 4A and FIG. 4B.

First, raw water 52 is supplied into the raw water tank 50. The second filter 2 which is a self-generated film is formed on the filtration surface of the first filter 1 by causing the raw water 52 to pass through the filter apparatus 53 by applying a suction power from the pump 55. At this stage, the fluid that passes through the pipe 56 is not sufficiently filtered and is therefore turned to raw water 52. Also, the filtered water at this stage is not stored in the peel cistern 70.

Next, the raw water 52 is filtered using the filter apparatus 53 having a second filter 2 sufficiently formed. At this stage, the filtered water obtained from the filter apparatus 53 has a sufficient degree of transparency and can therefore be discharged outside the filtration apparatus 20. Also, a part of the filtered water is stored in the peel cistern 70.

As the filtration process progresses, the second filter 2 gradually clogs, as shown in FIG. 4B, and the amount of filtered water decreases. A process of removing the second filter 2 is then carried out. First, the pump 55 which inputs a suction power to the filter apparatus 53 is halted so that the filtered water stored in the peel cistern 70 is caused to flow back into the filter apparatus via the pipe 56. The filtered water is caused to flow back into center 5 of the filter apparatus 53 so that the pressure acting from inside to outside is applied to the filter apparatus 53. This pressure removes the second filter 2 from the first filter 1 and moves it downward. In order to facilitate the movement of the second filter, a large amount of air bubbles are generated from an air diffuser 54.

Merits of the above described configuration are described below. In this embodiment, the peel cistern 70 is positioned at a level above the liquid level of the raw water 52 where the filter apparatus 53 is immersed. The filtered water accumulated in the peel cistern 70 can thus be caused to flow back inside the filter apparatus 53 by the hydraulic pressure generated by the positional relationship of the peel cistern 70 and the raw water 52, without the need to use additional pumps.

Furthermore, clogging inside the first filter 1 can be prevented by causing pure filtered water filtered by the filter apparatus 53 to flow back. The holes provided in the first filter 1 are very fine, therefore, in case tap water or the like is used in the flow-back process, removables contained in the tap water cause the first filter 1 to clog from the inside. In this embodiment, clogging of the first filter 1 during the flow-back process can be prevented and cost of filtration can be reduced by using, in the flow-back process, filtered water generated by the filter apparatus 53 itself. Distilled water, etc. can also be supplied into the peel cistern, instead of filtered water.

FIFTH EMBODIMENT

A concrete example of a filtration apparatus is next described with reference to FIG. 5, wherein configuration elements which are same as those of the filtration apparatuses shown in FIGS. 1 thru 4 are denoted by the same numerical symbols.

Figure 5:
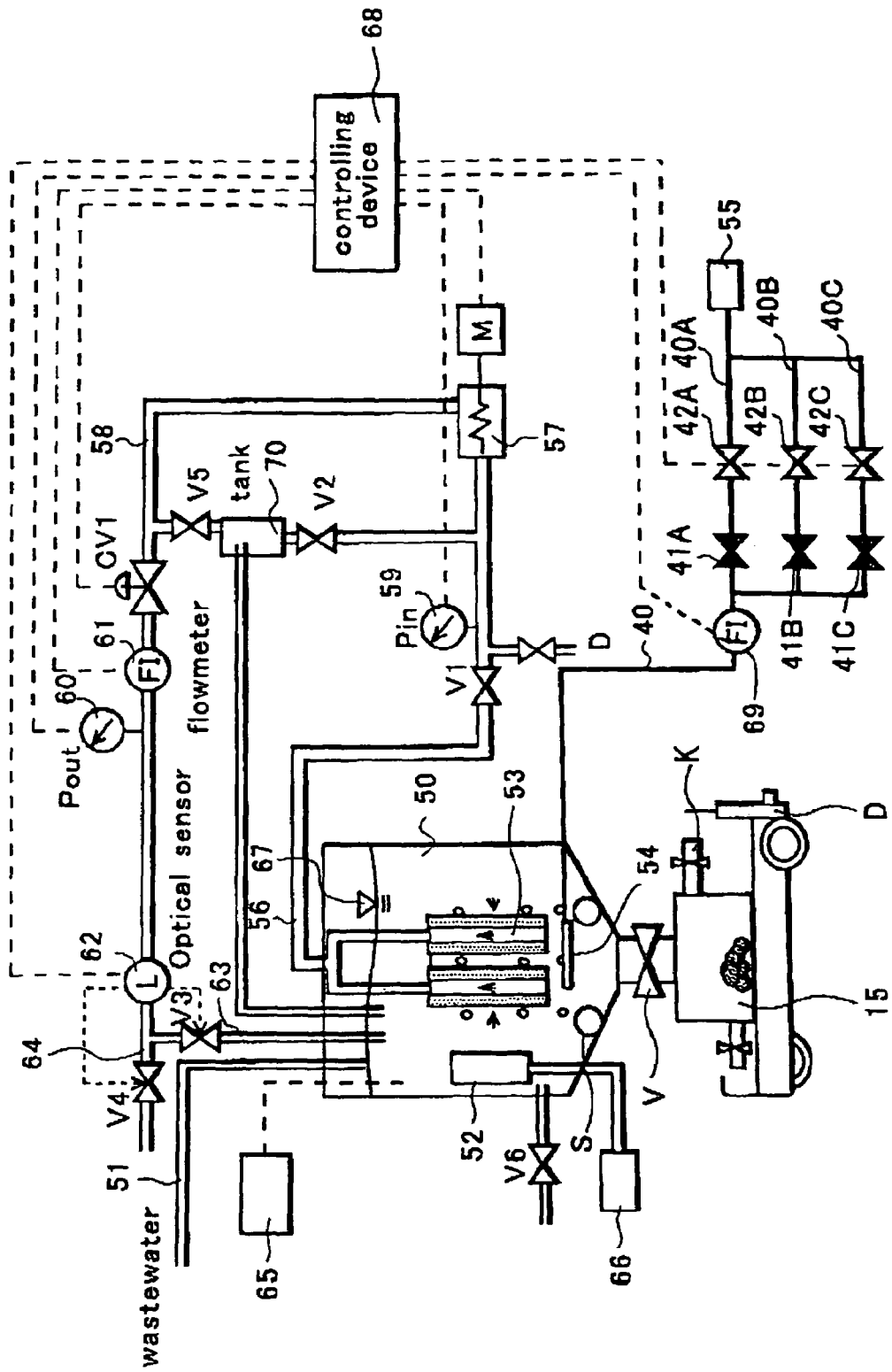
FIG. 5 shows a concrete filtration apparatus according to an embodiment of the invention.

In FIG. 5, a pipe 51 is provided as a means for wastewater supply above a raw water tank 50. The pipe 51 supplies a fluid containing removables into the raw water tank 50. For instance, to better describe this using semiconductor-related terms, it is the pipe that supplies wastewater (raw water) containing removables of a colloidal solution which flows from dicing apparatuses, backgrinding apparatuses, mirror polishing apparatuses or CMP apparatuses. A further description is next given of the wastewater as wastewater comprising abrasive coating flowing from the CMP apparatus and waste resulted from polishing or grinding by the abrasive coating.

An adjustment valve 41 and a stop valve 42 are provided in an air pipe that connects an air pump 55 and an air diffuser 54. The adjustment valve 41 is configured so that a desired amount of gas is allowed to pass therethrough, for example, a needle valve, etc. can be adopted as an adjustment valve. The stop valve 42 controls releasing and blocking of the gas flowing inside the air pipe 40. More concretely, a valve, etc. using for instance solenoid, etc., can be employed as the stop valve 42. A desired amount of gas can thus be supplied to the air diffuser 54 by using in combination an adjustment valve 41A and the stop valve 42, that is, only open/close stop valve 42 while fixing an output of the air pump 55.

Furthermore, a plurality of parallel paths branch off from the air pipe 40. In more detail, a first path 40A, a second path 40B and a third path 40 C parallel to each other branch off from the air pipe 40. Each of these paths is provided with the adjustment valve 41 and stop valve 42, respectively.

A first adjustment valve 41A and a first stop valve 42A are provided in the first path 40A. The first adjustment valve 41A is regulated so that an appropriate amount of gas is allowed to pass during the filtration operation of the filter apparatus 53. During the filtration process using the filter apparatus 53 or during the formation process of the gelatinous second filter, the first stop valve 24A is opened. Also, when the first stop valve 42A is in an open state, the second stop valve 42B and the third stop valve 42C are both in a close state. It is thereby possible, in the filtration process, to supply a moderate amount of gas from the air diffuser 54 via the first adjustment valve 41A thus regulated. Accordingly, the raw water in the raw water tank 50 is mixed by the air bubbles rising from the air diffuser 54, so that a smooth filtration is enabled.

The second adjustment valve 41B and the second stop valve 42B are provided in the second path 40B. The second adjustment valve 41B is set to allow the passage of a larger amount of gas than the first adjustment valve 41A. The second stop valve 42B is opened during the process of removing (regeneration process) the gelatinous second filter from the first filter, both filters forming the filter apparatus 53. The second filter can be removed by supplying a large amount of gas from the air diffuser 54 into the raw water. When the second stop valve 42B is in an open state, the first stop valve 42A and the third stop valve 42C are in a close state.

The third adjustment valve 41C and the third stop valve 42C are provided in the third path 40C. The third adjustment valve 41C is set to allow the passage of a smaller amount of gas than the first adjustment valve 41A and the second adjustment valve 41B. The third stop valve 42C is opened when the operation of the entire filtration apparatus 20 is halted. When the third stop valve 42C is in an open state, the first stop valve 42A and the second stop valve 42B are in a close state. Clogging of the air diffuser 54 can be prevented by maintaining the third stop valve 42C in an open state when the filtration operation of the entire filtration apparatus 20 is halted.

The pipe 56, wherein filtered fluid filtered in the filter apparatus 53 flows, is connected to a magnet pump 57 which suctions via a valve V1. A pipe 58 connects the magnet pump 57 with a valve V3 and a valve V4 via a control valve CV1. A first barometer 59 is provided after the valve V1 of the pipe 56 for measuring a suction pressure Pin. A flowmeter F and a second barometer 60 are provided after the control valve CV1 of the pipe 58, wherein the flowmeter 61 controls a constant flow rate. A control valve CV2 controls the flow rate of the air from the air pump 55.

A plurality of filter apparatuses 53 comprising a second filter are placed in the raw water 52 accumulated in the raw water tank 50. An air diffuser 54, similar for instance to a bubbling apparatus used in fish aquariums and having small holes opened in a pipe thereof, is placed at a lower part of the filter apparatus 53 and the position thereof is adjusted so that air bubbles generated therefrom can pass through a surface of the filter apparatus 53. An air pump 55 supplies gas to an air diffuser 54 via an air flowmeter 69. An air pump 40 connecting the air diffuser 54 and the air pump 55 is provided with the above-described first path 40A, the second path 40B and the third path 40C. Also, the first stop valve 42A, the second stop valve 42B and the third stop valve 42C are electrically connected with the controller 68.

The pipe 56 fixed in the filter apparatus 53 and circulated by filtered fluid filtered by the filter apparatus 53 is connected to the magnet pump 57 which suctions via a valve V1. The pipe 58 connects the magnet pump 57 and valve V3 and valve V4 via the control valve CV1. A first barometer 59 is provided after the valve V1 of the pipe 56 for measuring the suction pressure Pin. A flowmeter 61 and a second barometer 60 are provided after the control valve CV1 of the pipe 58,wherein the flowmeter 61 controls a constant flow rate of the filtered water.

The pipe 58 is connected to an optical sensor 62, and is conducted to pipes 63 and 64 branching off from the optical sensor 62. Pipes 63 and 64 contain valves V3 and V4, respectively, which are opened/closed based on a detection signal from the optical sensor 62, wherein pipe 63 returns filtered water to the raw water tank 50 and pipe 64 discharges filtered water to the exterior. The optical sensor 62 monitors the concentration of the microparticles contained in the filtered water to determine that the mix rate of the microparticles is smaller than a desired value, after which filtration is started. When the filtration process is started, the valve V3 is closed based on a detection signal from the optical sensor 62 and the valve V4 is opened to discharge pure water to the exterior.

The peel cistern 70 is connected to the pipe 58 via a valve V5 and has a function of storing the filtered water, which, when exceeding a constant value, overflows and is returned into the raw water tank 70 via a pipe 71. A valve V2 is provided at a lower part of the pipe 71 which is connected to the pipe 56. The peel cistern is positioned about 10 to 20 cm above the fluid surface of the raw water tank 50 and is used during the regeneration process of the second filter.

A pH regulator 65 and a temperature adjusting device 66 are provided in the raw water tank 70 for adjusting in particular the pH of the CMP wastewater to a range of 6 to 7 and for adjusting the temperature of the wastewater for facilitating the gel formation process. A liquid level meter 67 monitors the level of the wastewater in the raw water tank 50 to prevent overflow thereof and adjusts the inlet flow of the wastewater.

Furthermore, a controlling device 68 for controlling the operation of the filtration apparatus is provided. This controls the control valve CV1, the flowmeters 61 and 69, the pump 57, the barometers 59 and 60, the optical sensor 62, etc. in the processes where they are used, respectively, as shown by the dashed line.

In the second filter formation process, the filtration process, the second filter regeneration process, the re-filtration process and the maintenance process, the controlling device 68 opens/closes the valves, etc. and controls the operation of the pump 57, etc. The operation status thereof in each of the processes is described below. FIG. 6 shows the operation status of the pump 57, the optical sensor 62, the air pump 55 and each of the valves in each respective process.

First, wastewater containing removables of a colloidal solution is supplied into the raw water tank 50 via a pipe 51. A number of filter apparatuses comprising only a first filter 1 without a second filter 2 formed thereon are immersed in the raw water tank leaving a space thereamongst so that a desired filtration flow rate can be obtained. Concretely, figures here do not illustrate around 10 to 40 filter apparatuses but these apparatuses are mounted in a support means. The number of the filter apparatuses 53 differs depending on the filtration surface of one filter apparatus 53, and the total filtration surface of the filter apparatuses 53 depends on the size of the raw water tank 50.

Next, the second filter 2 formation process is carried out. The wastewater is caused to circulate inside the raw water tank 50 while suctioning with a weak suction pressure from the pump 57 via the pipe 56. The circulation path includes the filter apparatus 53, the pipe 56, the valve V1, the pump 57, the pipe 58, the control valve CV1, the flowmeter 61, the optical sensor 62, and the valve V3. The wastewater is thereby suctioned from the raw water tank 50 and is returned to the raw water tank. Air bubbles supplied by the air pump 55 to the air diffuser 54 via the first path 40A rise up to the surface of the filter apparatus 53. In other words, the first stop valve 42 A is opened so that a desired amount of gas is supplied to the air diffuser 54 via the first adjustment valve 41A. At this time, valves V2, V4, V5, V6 and D are closed.

A second filter 2 is formed in the first filter 1 of the filter apparatus 53 by causing the wastewater to circulate so that the removables of a colloidal solution are finally captured (the concrete principle thereof is further described). When the wastewater is suctioned by the pump 57 through the first filter 1 using a weak suction pressure, the microparticles of removables are gelatinized as they get closer to the first filter and adhere to the surface of the first filter 1. The gelatinous microparticles which are larger than filter holes 11 provided in the first filter 1 are absorbed thereby and therefore are gradually deposited on the surface of the first filter 1, thus forming the second filter 2 which is a gel film. Gelatinous microparticles having a smaller diameter than the filter holes 11 pass through the first filter, but, together with the formation of the second filter 2, the water inside the wastewater is suctioned using these spaces as passages, and then passes through the first filter 1 to be finally discharged to the outside as filtered, pure water.

At this time, the optical sensor 62 monitors the concentration of the microparticles contained in the filtered water and after it determines that the mix rate of the microparticles is lower than a desired value, the filtration process is started.

When the formation of the second filter 2 is completed, the filtration process is started. The valve V3 is closed based on the detection signal from the optical sensor 62, the valve V4 is opened and the above-described circulation path is closed so that filtered water can be discharged from valve V4. In this process, the controlling device 68 controls the flowmeter 61 so that a constant filtration flow rate is set and clogging of the second filter 2 is prevented, thereby preserving filtration capabilities thereof for a long time. As shown in FIG. 12, the suction pressure Pin of the pump 57 is gradually increased to keep a constant filtration flow rate. The other elements have the same operation as in the filter formation process. In this process, gas is supplied to the air diffuser 54 via the first path 40A.

When the second filter is damaged due to different causes, the optical sensor 62 detects the mix rate of the microparticles and the filtered water is returned into the raw water tank 50 by closing the valve V4 and opening the valve V3. In other words, the second filter 2 is restored by returning to the filter formation process and after that, carrying out the re-filtration process.

The filtration process is continuously carried out and water inside the wastewater contained in the raw water tank 50 is discharged to the outside of the raw water tank 50 as filtered water thus raising concentration of the removables in the wastewater. More precisely, the colloidal solution is concentrated and the viscosity thereof is increased. Due to this, wastewater is supplied into the raw water tank 50 via a pipe 51 in order to suppress the rise in the wastewater concentration and improve filtration efficiency. However, a thick gel film adheres to the surface of the second filter 2 of the filter apparatus 53 and eventually causes clogging of the second filter 2 thus blocking filtration.

When a thick gel film adheres to the surface of the second filter 2 of the filter apparatus 53, a decrease in the filtration flow rate is detected at the flowmeter 61 and the process of regenerating the second filter is started by the controlling device 68.

In the filter regeneration process, the pump 57 is halted thus canceling the negative suction pressure applied to the filter apparatus 53. At the same time, the valve V2 is opened and the filtered water stored in the peel cistern 70 in advance is sent back into center 5 of the filter apparatus 53 via valve V1 by reversing the flow in the pipe 56.

Consequently, in the filter regeneration process, the weak suction pressure is stopped, thus returning to atmospheric pressure and the first filter 1 of the filter apparatus 53 is restored from a concave shape caused by the suction pressure to its original shape. The second filter 2 and the gel film adhered to a surface thereof similarly return to their original shape. As a result, the suction pressure causing the gel film to adhere disappears, thus causing the gel film to lose adsorbability to the filter apparatus 53 and to be influenced by a force triggering swelling of the film towards the exterior. Furthermore, the peel cistern is positioned at a level above the fluid level in the raw water tank 50 so that a hydrostatic pressure generated by the difference of elevation threbetween is applied by the back flow of the filtered water from the peel cistern 70 so that the first filter 1 and the second filter 2 of the filter apparatus 53 are caused to swell to the exterior. Accordingly, the gel film adhered thereto starts separating from the filter apparatus 53 by its own weight and by the hydrostatic pressure. Experiments show that separation begins from a lower end of the filter apparatus 53 and continues with the separation of the second filter 2 adhered to the surface of the first filter 1, similar to an avalanche. Separated parts precipitate to the bottom of the raw water tank 50. Next, water is caused to circulate in the circulation path described above and the second filter 2 is re-formed. In this regeneration process, the second filter 2 is restored to its original state enabling re-filtration of wastewater. At this time, the valve V2 is closed and the valve V5 is opened so that filtered water can be accumulated into the peel cistern 70 in view of the next filter regeneration process.

In order to facilitate the removal of the filter, the amount of air bubbles generated by the air diffuser 54 may be doubled. More precisely, the second stop valve 42B is opened whereas the first stop valve 42A and the third stop valve 42C are closed.

The re-filtration process is then started and wastewater is filtered again. Operation is similar with the filtration process. After repeating the filtration process for a number of times while regenerating the second filter 2, the concentration of the removables in the wastewater contained in the raw water tank 70 increases and eventually, the wastewater becomes more and more viscous. When the concentration of the removables of the wastewater exceeds a desired concentration value, filtration is halted and the maintenance process is carried out.

The maintenance process comprises the step of discharging the filtered water contained in the pipes 56 and 58 and in the peel cistern 70 and the step of discharging the wastewater contained in the raw water tank 50 and the gel accumulated at the bottom thereof. In the former step, pump 57 and air pump 55 are halted and control valve CV1, valves V1, V2 and V5 are opened so that the filtered water inside pipes 56 and 58 and in the peel cistern 70 is discharged to the outside via a discharge valve D provided in the pipe 56.

In the latter stage, the concentrated slurry at the bottom of the raw water tank 50 is left to precipitate for flocculation purposes and is then recovered by opening valve V6. The so-recovered concentrated slurry is heat-dried to further concentrate it by vaporizing the water contained therein. Consequently, the amount of slurry handled as industrial waste can be substantially reduced. The supernatant wastewater is similarly discharged via valve V6 and is fed back to the filtration process or is returned to the raw water tank 50.

Next, an embodiment of the filter apparatus 53 as immersed inside the raw water tank 50 is described with reference to FIG. 7 and FIG. 8.

Figure 7A:
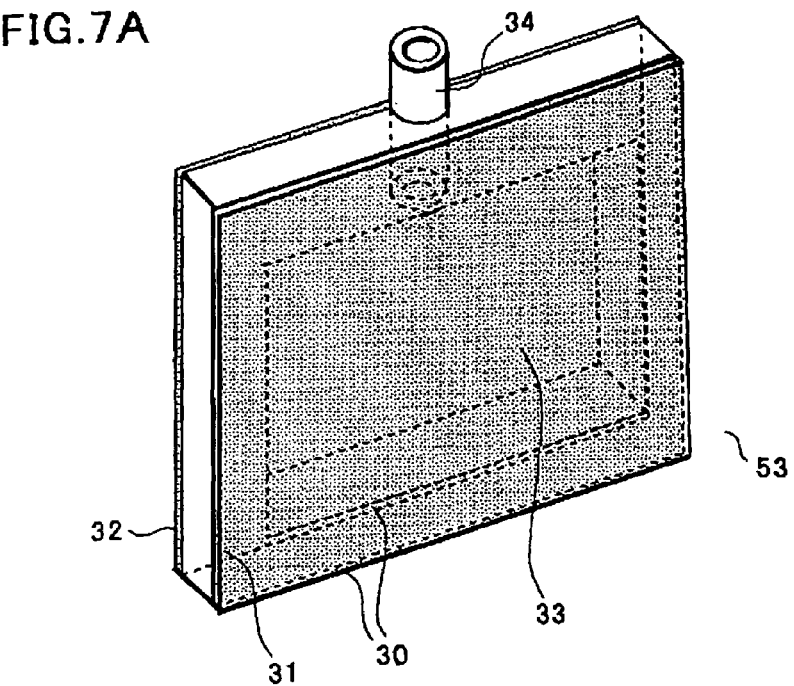
FIG. 7 shows a filter apparatus according to an embodiment of the invention.

A frame 30 having a frame-like shape as shown in FIG. 7A is provided on both surfaces thereof with filter films 31 and 32 which form the first filter. Inner spaces 33 surrounded by the frame 30, the filter films 31 and 32 which filtrate the wastewater by applying a pressure from the pipe 34. The filtered water is then discharged via a pipe 34 sealed to the frame 30. The filter films 31 and 32 and the frame 30 are perfectly sealed so that wastewater does not enter the spaces 33.

Filter films 31 and 32 shown in FIG. 7A are thin resin films and may be warped or damaged when suctioned. Thus, in order to decrease this space as much as possible and increase filtration capabilities, it is necessary that these spaces 33 be formed larger. This is solved by the mechanism shown in FIG. 7B. In this figure, only 9 spaces 33 are illustrated, but in reality, a larger number of spaces 33 may be formed. Also, the filter film 31 actually used is a polyolefin polymer membrane having a thickness of about 0.1 mm, as shown in FIG. 7B by the thin pouched filter film FT. The frame 30 integrated with the pipe 34 is inserted in the pouched filter FT and these two are then secured together. The frame having the filter FT attached thereto is held from both sides by holding support RG. Filter FT is exposed from an opening OP provided in the holding support RG. A more detailed description is provided with reference to FIG. 8.

Figure 7C:
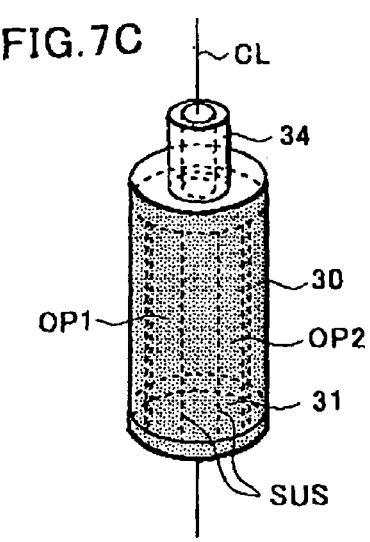
Figure 7B:
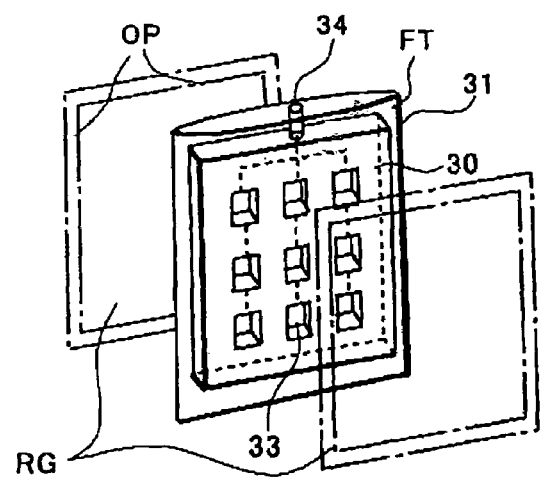

FIG. 7C shows a filter apparatus 53 having a cylindrical shape. The frame attached to the pipe 34 is cylindrical and is provided on a side surface thereof with openings OP1 and OP2. Due to the fact that parts of the side surface corresponding to openings OP1 and OP2 are removed, support SUS is provided between the openings for supporting the filter film 31. Next, the filter film 31 is attached to the side surface.

The filter apparatus 53 illustrated in FIG. 7B is described in more detail with reference to FIG. 8. A part 30a corresponding to the frame 30 from FIG. 7B is described referring to FIG. 8A and FIG. 8B. At a first sight, part 30a is similar to a cardboard. Thin resin sheets SHT1 and SHT2 having about 0.2 mm each are stacked and a plurality of sections SC are provided thereinbetween in a vertical direction so that a space 33 surrounded by the resin films SHT1, SHT2 and the section SC is formed. The cross-section of this space 33 is a rectangle sized 3 mm×4 mm, in other words, a plurality of straws having a rectangular cross-section are aligned and integrated. Part 30*a* is called a spacer in the description below because it maintains the filter film FT on both sides at a certain interval.

A plurality of holes HL of 1 mm in diameter are provided on the surface of the thin resin sheet SHT1 and SHT2 forming the spacer 30*a* and the filter film FT is attached to the surface. Accordingly, the filtered water filtered by the filter film FT passes through the holes HL and the space 33 and is finally discharged using the pipe 34.

The filter film FT is also attached to both surfaces SHT1 and SHT2 of the spacer 30*a*. Surfaces SHT1 and SHT2 of the spacer 30*a* comprise parts where no holes HL are formed, so that when filter film FT1 is attached directly thereto, filter film FT1 corresponding to parts where such holes HL are not formed has no filtration capabilities and therefore does not allow the passage of wastewater. Consequently, parts which do not capture removables are formed. In order to prevent this phenomenon, at least 2 filter films FT are provided. The outermost filter film TF1 is a filter film that captures removables. A filter film FT2 is also provided comprising holes which are formed to be larger than the holes provided in the filter film FT1 as it draws near the surface SHT1 of the spacer 30*a*. Consequently, the entire filter film FT1 is enabled with filtration capabilities even in parts where holes HL of spacer 30 are not formed, because of the existence of filter film FT2 allowing removables to be captured on the entire surface of the filter film FT1, so that a second filter film is formed on the entire surfaces SH1 and SH2 of both surfaces. In this figure, for the sake of convenience, filter film SHT1 and SHT2 are formed as a rectangular sheet, but in reality they are pouched as shown in FIG. 7B.

Next, a description is given of how the pouched filter films SHT1, SHT2, the spacer 30*a* and the holding support RG are attached referring to FIG. 8A, FIG. 8C and FIG. 8D.

FIG. 8A is a completion drawing, FIG. 8C is a figure showing the apparatus described in FIG. 8A along the A-A line, that is from the head of the pipe 34 in the extending direction (vertical direction) of the pipe, FIG. 8D is a sectional view taken along the B-B line, that is, in a horizontal direction of the filter apparatus 35.

As can be understood from FIG. 8A, FIG. 8C and FIG. 8D, spacer 30*a* inserted in the pouched filter film FT, including the filter film FT are held on 4 sides thereof by the holding support RG. The pouched 3 sides and the remaining side are secured by an adhesive agent AD1 applied to the holding support RG. A space SP is formed between the remaining side (openings) and the holding support RG so that filtered water generated in the space 33 is suctioned by the pipe 34 via the space SP. An adhesive AD2 is applied in the entire opening OP of the holding support RG so that it is perfectly sealed and fluid is prevented from entering therein.

Space 33 communicates with pipe 34, so that when suction is applied through pipe 34, the fluid passes via the holes of the filter film FT and the holes HL of the spacer 30*a* and is directed to the spaces 33. The filtered water can then be discharged to the exterior via the pipe 34.

The filter apparatus 53 used here has a configuration as the one described in FIG. 8 and the size of the frame (holding support RG) for attaching the filter film is A4 size, more precisely, about 19 cm by 28.2 cm, and 5 to 10 mm in thickness. The filter apparatus 53 is actually on both sides of the frame so that the surface doubles (surface: 0.109 m$^2$). However, the number and size of the filter apparatus is freely selected depending on the size of the raw water tank 50 and on the filtration rate required.

Next, the principle of filtering raw water using the gelatinous second filter is described. At first, terms to be used in the following description are defined.

A colloidal solution refers to a medium having microparticles with a diameter of 1 nm to 1 μm dispersed therein. These microparticles have a Brownian motion and can pass through a common filter paper but cannot pass through a semipermeable membrane. Because electrostatic repulsive force works between very fine particles having an extremely slow coagulation rate, chances that they come close to each other are reduced.

Sol is used as a substantial synonym for colloidal solution, but sol is different from gel in that it is dispersed in the medium and shows mobility, so that the microparticles have an energetic Brownian motion.

Gel refers to the colloidal particles which have lost their independent mobility and gather together to solidify. For instance, when agar or gelatin is melted down in warm water, they disperse and form a gel. When this gel is cooled down, the resulted gel loses mobility. Some types of gel can include hydrogel comprising a large amount of liquid and xerogel dried to some degree.

Removal and drying of water from a dispersion medium, addition of electrolyte salts to silica slurry (pH 9 to 10) and adjustment of pH up to pH 6 or 7, loss of mobility due to cooling down are just a few of the causes leading to gelatinization.

Slurry refers to the colloidal solution or the sol used in polishing and contains particles, fluid and chemicals. Abrasives used in the CMP process described above are called CMP slurry. CMP slurry is known to include silica abrasive, aluminum oxide (alumina) abrasive, cerium oxide (ceria) abrasive, etc. The abrasive used most frequently is silica abrasive, one type thereof which is largely used is colloidal silica. Colloidal silica refers to a dispersion liquid, called silica sol, wherein very fine silica particles with a colloid size of 7 to 30 nm are dispersed homogeneously in a water or organic liquid medium without precipitating. Particles of the colloidal silica are monodispersed in water so that even if the colloidal silica is left unattended for more than one year, the colloid particles do not precipitate almost at all due to their mutual force of repulsion.

The resent invention provides a method of removing removables from wastewater by filtering the removables from wastewater which comprises removables in a colloid fluid or sol.

Removables are a colloid fluid (sol) containing a large amount of microparticles having a particle size distribution of 3 nm to 2 μm, such as for example, silica and alumina used in the CMP process or abrasive coating such as ceria, etc. and semiconductor material waste, metal waste and/or insulation film material waste generated by grinding with abrasive coating. Here, slurry (W 2000) from tungsten polishing from Cabot Micro Electronics Co. is used as CMP slurry. The slurry mainly comprises silica having a pH of 2.5 and a particle size distribution of 10 to 200 nm.

The basic principle of the present invention is described with reference to FIG. 9. With the present invention, a fluid (wastewater) containing removables of a colloid solution (sol) is filtered using a filter comprising a gel film formed of removables.

More concretely, a gel film as a second filter 2 is formed of CMP slurry comprising removables of a colloid solution on a surface of a first filter 1 formed of organic polymers. Filters 1 and 2 are immersed inside a tank containing fluid 3 where they carry out filtration of wastewater containing removables.

Organic polymers or ceramic can be used in principle as materials for the first filter 1 considering that a gel film is to adhere thereto. Here, a polyolefin polymer membrane having a thickness of 0.1 mm and an average hole diameter of 0.25 µm is used. FIG. 10B shows a picture of a surface of the polyolefin filter film.

The first filer 1, which is a flat membrane provided on both sides of a frame 4, is immersed perpendicularly in the fluid and wastewater is suctioned by a pump 6 from center 5 of the frame 4. Filtrate 7 is then discharged.

Next, a second filter 2, which is a gel film, adheres to the entire surface of the first filter 1 by suctioning and gelatinizing the sol containing removables. Typically, a gel film is a gel which is believed to have no filtration capabilities. However, with this invention, the gel film is endowed with filtration capabilities by selecting the gel film formation conditions. These conditions are described later.

After the second filter 2 which is a gel film made of removables of a colloid solution (sol) is formed, filtration of the removables is carried out. This is described with reference to FIG. 9 and FIG. 10A.

The first filter 1 is provided with filter holes 11. The film formed as a layer in the openings of the filter holes 11 and on the surface of the first filter 1 is a gel film formed of removables 13. Removables 13 are absorbed via the first filter by applying a suction pressure from a pump, moisture from the fluid 3 is removed by drying (dehydration) so that microparticles of the removables from the colloid fluid merge together and gelatinize. This gel film corresponds to the second filter 2 which cannot pass through the filter holes 11.

When the second filter 2 reaches a predetermined film thickness, spaces are formed therein which do not allow the passage of gel removables and filtration of removables of colloid substance is started using this second filter 2. After the filtration process is performed a number of times while suctioning by pump 6, the gel film on the surface of the second filter 2 gradually stacks and thickens, so that eventually the second filter 2 clogs and filtration is impeded. While the colloid solution is gelatinized, water from the colloid solution that adhered to the surface of the second filter passes through the first filter and is discharged as filtered water.

Figure 10A:
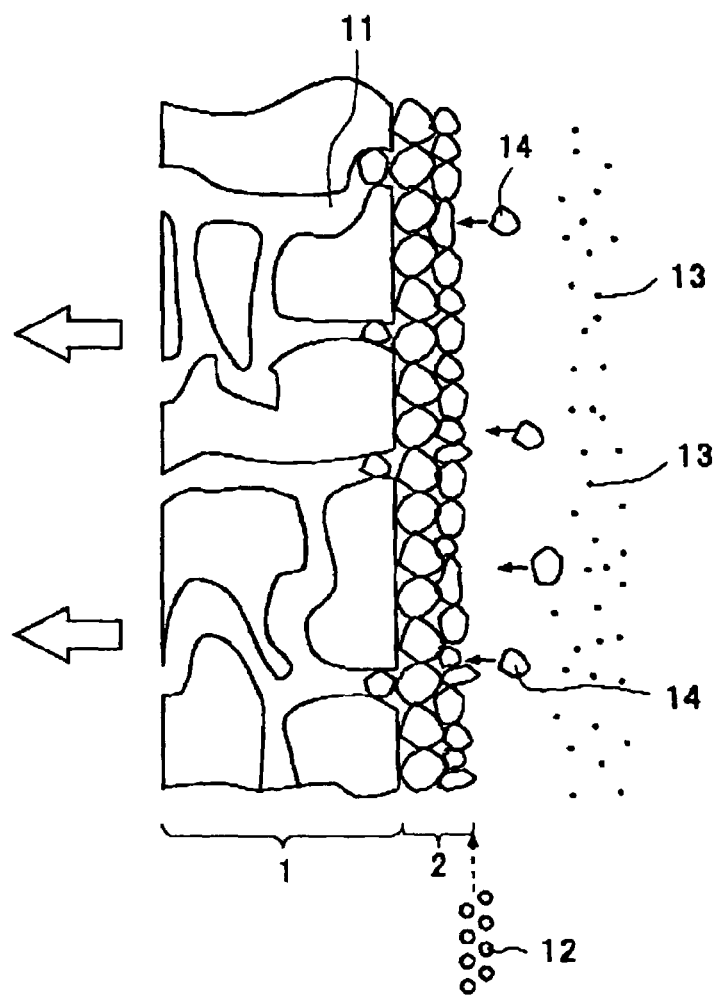
FIG. 10 illustrates the operation principle of the filter.
Figure 10B:
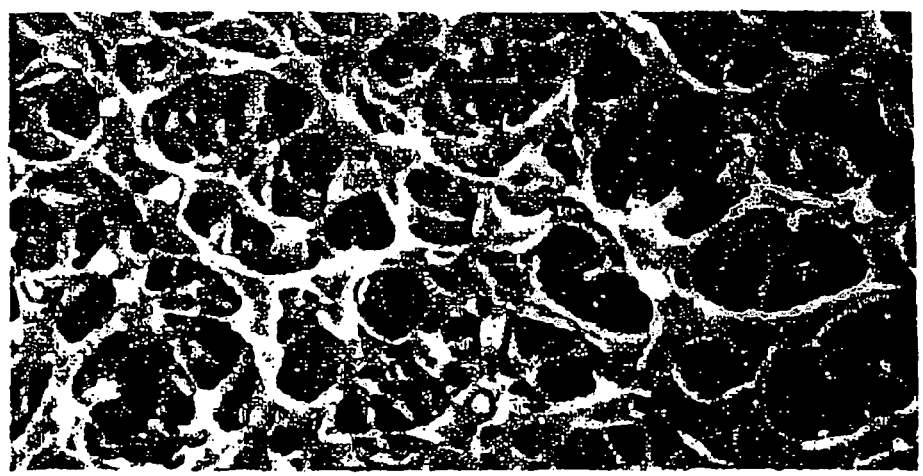

FIG. 10A shows wastewater containing colloid fluid with removables, on one side of the first filter 1 and filtered water which passed through the first filter 1, on the other side thereof. Wastewater is suctioned and flows in the direction shown by the arrows. Microparticles in the colloid solution lose their electrostatic repulsive force as they get closer to the first filter 1 and are gelatinized. The second filter 2 is formed by the gel film comprising some microparticles that merged together and adheres to the surface of the first filter 1. Wastewater is filtered by means of the second filter 2 while gelatinizing removables inside the colloidal solution. Filtered water is suctioned from the opposite side of the first filter 1.

The water inside the wastewater is thus discharged by smoothly suctioning wastewater of the colloid solution via the second filter 2 and removables are captured to form the gel film by drying, gelatinizing them so that they stack on the surface of second filter.

Next, second filter 2 formation conditions and the subsequent filtration rate are described with reference to FIG. 11.

This invention provides a process for forming a second filter 2 and a process for re-filtration. The purified water filtration rate during filtration largely varies depending on the second filter 2 formation conditions. Accordingly, it was determined that when purification conditions of the second filter 2 are not properly selected, filtration using the gelatinous second filter 2 is almost impossible. This fact coincides with the conventional art, where it was known that filtration of colloid solution is impossible.

Figure 11A:
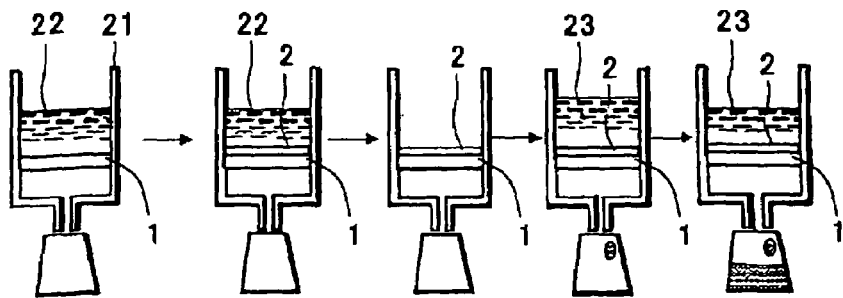
FIG. 11A is a cross-sectional view and FIG. 11B is a characteristics diagram showing the conditions for the formation of the second filter film according to an embodiment of the invention.
Figure 11B:
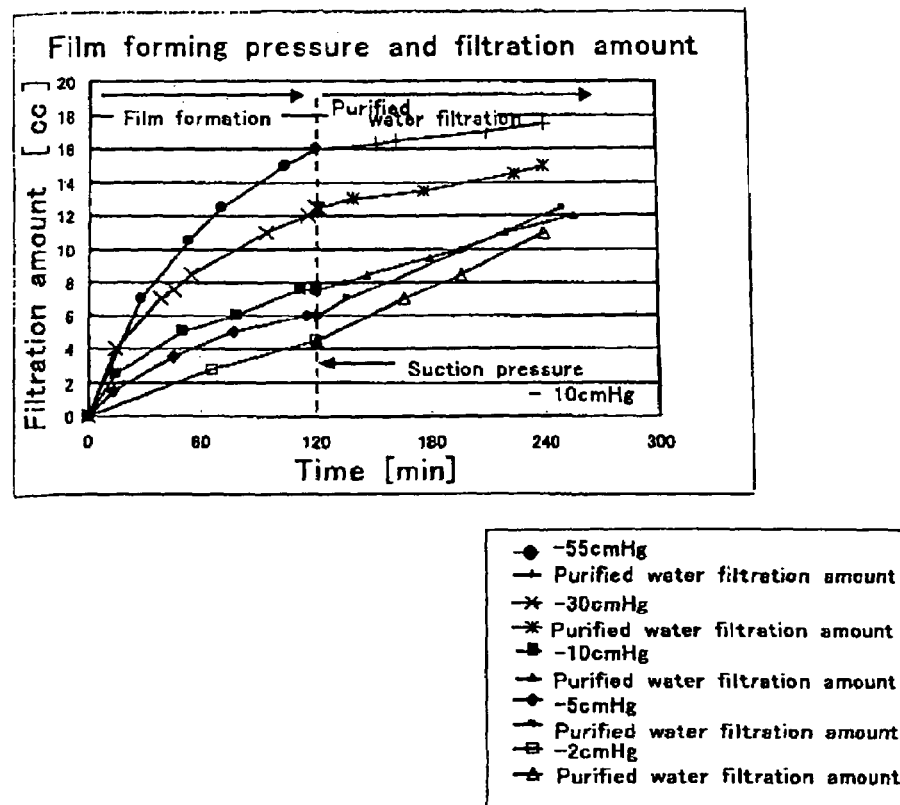

The characteristics shown in FIG. 11B are all proved by experiments carried out according to the method shown in FIG. 11A. A first filter 1 is provided at the bottom of a cylindrical container 21 and a concentrate solution 50 cc of a tungsten polishing slurry 22 (W 2000) from Cabot Micro Electronics Co. is supplied thereto. Formation of the gel film is carried out by varying the suction pressure. Next, the slurry 22 that remained is removed and after supplying 100 cc of purified water 23, filtration is carried out at a very low suction pressure. It is thus possible to determine the filtration characteristics of the gelatinous second filter 2. The first filter 1 used at this time has a diameter of 47 mm and has a surface of 1734 mm$^2$.

In the gel film formation process shown in FIG. 11B, gel film characteristics when the suction pressure is varied among −55 cm Hg, −30 cm Hg, −10 cm Hg, −5 cm Hg, −2 cm Hg and the formation process lasts for 120 minutes were examined. Results show that filtration rate is best when suction pressure is set to −55 H, so that in 2 hours the filtered amount is 16 cc, then decreasing in turn to 12.5 cc, 7.5 cc, 6 cc, 4.5 cc.

Next, purified water is supplied and filtration is carried out using this gel film. The suction pressure at this time is set to −10 cm Hg. With the gel film formed at a suction pressure of −55 cm Hg, only 0.75 cc/h can be filtered, with a gel film formed at a suction pressure of −30 cm Hg, filtration rate is about 1 cc/h. However, with a gel film formed at −10 cm Hg, filtration rate is 25 cc/h, with a gel film at −5 cm Hg, filtration rate is 3.25 cc/h and with a gel film at −2 cm Hg, filtration rate is 3.1 cc/h. Accordingly, even with a gel film formed at a very low suction pressure, filtration is stable. From these experimental results it is determined that if the suction pressure in the second filter 2 formation process is set so that the filtration rate is about 3 cc/h, the filtration rate in the subsequent filtration process is the largest.

The reason for this is that, if the suction pressure is strong, the so-formed gel film has a low degree of swelling and solidifies due to compactness because the film is formed to be concentrated and thus contains a very small amount of water. This is probably because paths used by pure water to pass disappear.

When the suction pressure is decreased, the so-formed gel film has a high degree of swelling and it is soft due to a decreased density because the film contains a large amount of water and is formed in a state of swelling. Thus, a large number of paths allowing the purified water to pass therethrough can be obtained. The principle is more easily understood when imagining the snow powder slowly falling and thickening on the ground. One of the aspects of this invention is to provide a filtration method using a gel film formed at a very low suction pressure and having a high degree of swelling by causing moisture to pass through the gel film.

Figure 12A:
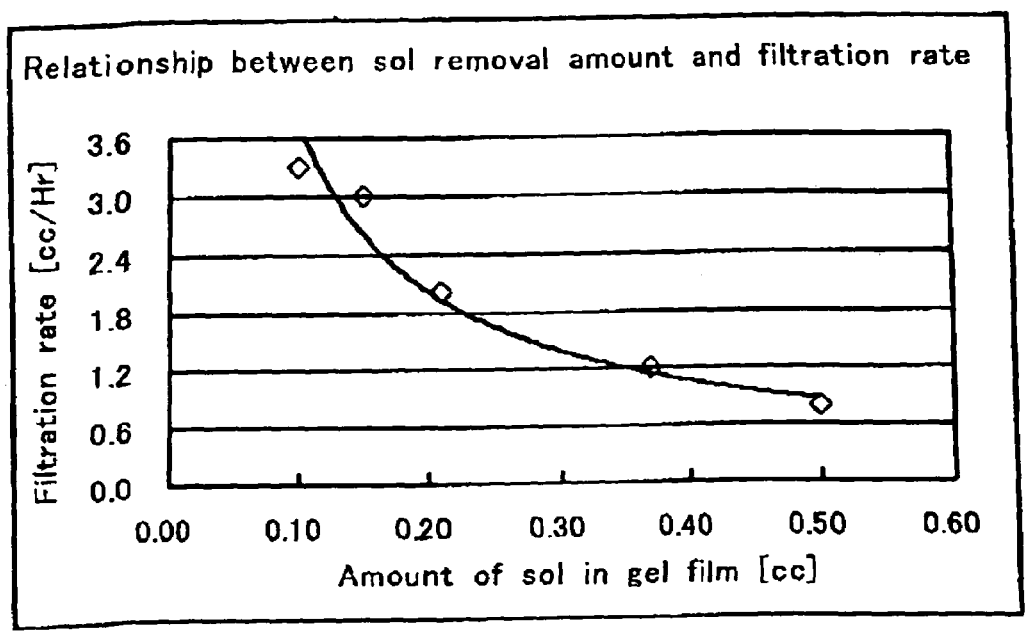
FIG. 12 shows the characteristics of the second filter.

Characteristics of the gel film are described with reference to FIG. 12. FIG. 12A shows the relationship between the sol amount contained in the gel film and the filtration rate. The amount of removed sol shows the sol amount captured by the first filter from the filtered amount during the gel film formation process when purified water having a slurry concentration of 3% is used. It is believed that the sol amount is an amount that gelatinizes and adheres as the second filter by drying by suction. It is also determined that at a very low suction pressure, the amount of sol during the second filter 2 formation process is very low. That is, when the filtration rate is 3 cc/h, the sol amount consumed is very low 0.15 cc, so that the smaller the amount of sol contained in the second filter 2, the higher the filtration rate. This is an important aspect of this invention. Accordingly, filtration of wastewater of colloid fluid can be achieved by forming a second filter 2 having a sol amount as low as possible.

Figure 12B:
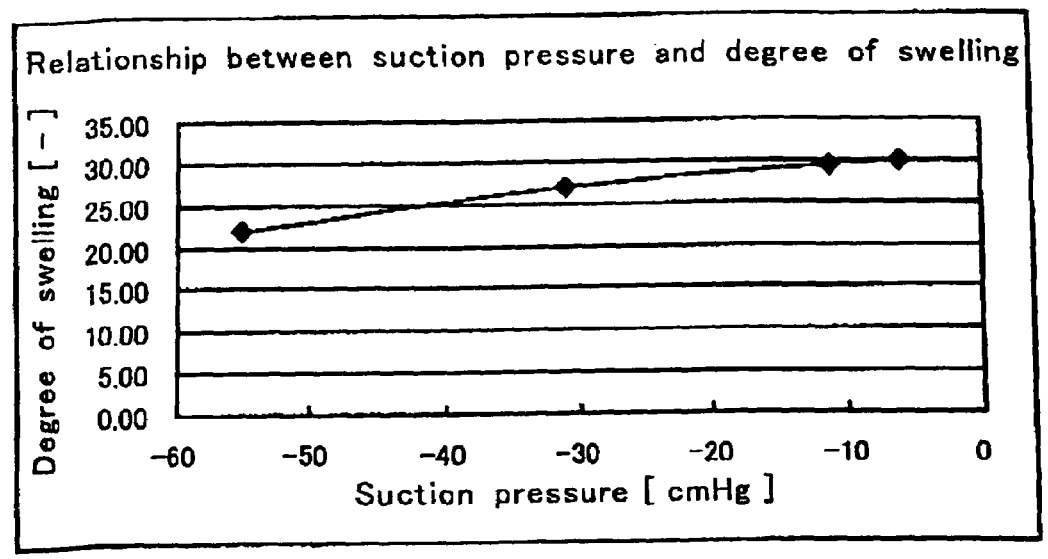

FIG. 12 B shows the swelling degree, more precisely, the density of the sol inside the gel film from the sol amount described above and the cubic volume of the gel film. Experimental results show that the second filter 2 film thickness; when the suction pressure is −30 mm Hg, it is 6 mm, and when −10 mm Hg, it is 4 mm and that the swelling degree increases from 27 to 30. More precisely, the greater the suction pressure, the smaller the swelling degree and the density of the sol amount in the second filter 2 increases. Also, the smaller the suction pressure, the thinner the second filter 2 film and the swelling degree increases. Accordingly, as shown in FIG. 12B, the filtration rate during the filtration process using the second filter 2 formed by reducing the suction pressure increases and filtration can be carried out over a long period of time.

Consequently, the main point of this invention is that the ability to filter wastewater of a colloid solution having fine particles equal to or under 0.15 μm is greatly influenced by the second filter formation conditions.

Figure 9:
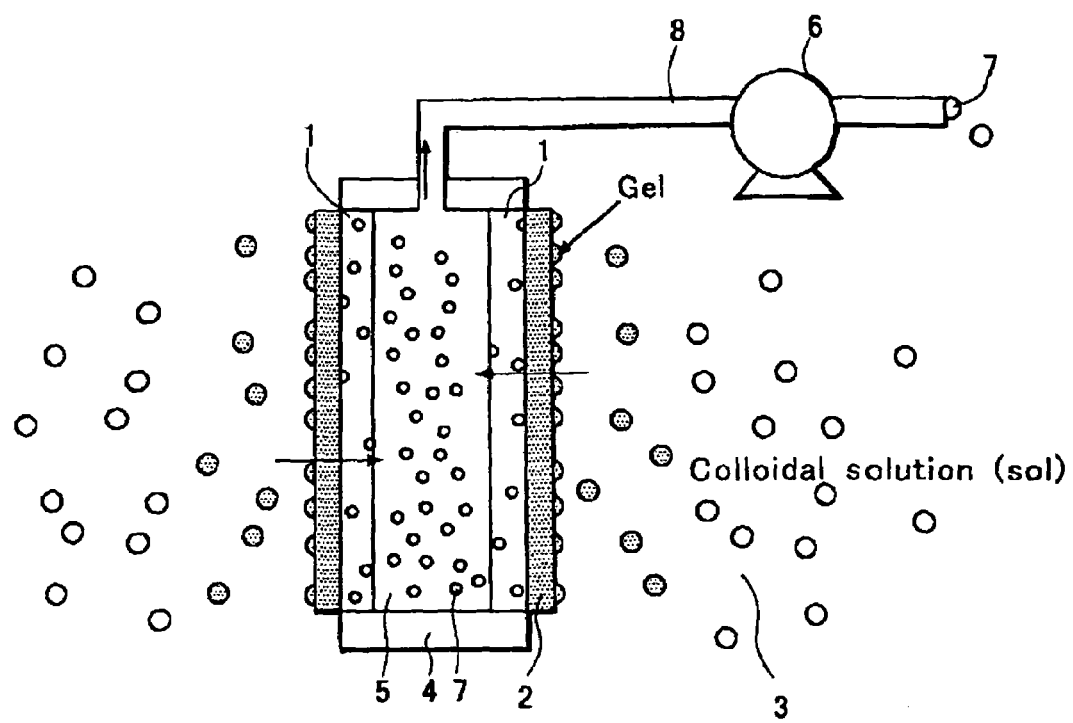
FIG. 9 illustrates a filter according to an embodiment of the invention.

The filter in FIG. 10A illustrates one side of the filter shown in FIG. 9 and is a pattern diagram showing how the gel film actually adheres.

The first filter 1 is immersed perpendicularly in the wastewater of colloid fluid and wastewater is the colloid fluid where removables 13 are dispersed. Removables 13 are shown by small black bullets. When wastewater is suctioned by applying a weak suction pressure from the pump 6 through the first filter 1 and as it draws nearer to the first filter, the microparticles of removables gelatinize and adhere to the surface of the first filter. The gelatinized microparticles 14 shown by white circles which are larger than filter holes 11 provided in the first filter 1 gradually adhere and pile up on the surface of the first filter 1 forming a gelatinous second filter 2. The gelatinized microparticles 14 having a smaller diameter than the filter holes 11 pass through the first filter but in the process of forming the second filter 2, the filtered water is caused to circulate and is returned to wastewater. The second filter 2 is formed along a 120 minute period as described above. In this process, the gelatinized microparticles 14 are suctioned at a very low suction pressure and thus pile up forming spaces with different shapes thus generating a second filter 2 with a flexible gel film having a very low degree of swelling. The water inside the wastewater is absorbed through this gel film having a high degree of swelling and is discharged as filtered water after it passes through the first filter.

More precisely, a gelatinous second filter with a high degree of swelling is formed by suctioning from the first filter 1 with a weak suction pressure so that the moisture contained in the gel film which is in contact with the first filter 1 is removed and the gel film is contracted, whereas moisture from the gel film contacting the wastewater is supplied and is caused to pass through the gel film, thus repeatedly causing a swelling of the gel film so that finally, only moisture is allowed to pass through the second filter 2.

Air bubbles 12 are generated from the bottom of the wastewater and are sent to the first filter 1 flowing parallel to the surface of the first filter. This is because the second filter 2 adheres uniformly and softly to the entire surface of the first filter due to the spaces formed therein. More precisely, here air flow rate is set to 1.8 1/minute, but it is always selected depending on the nature of the second filter 2.

In the filtration process, gelatinized microparticles 14 shown by white circles gradually pile up on the surface of the second filter 2 by suctioning with a weak suction force. At this time, the purified water passes through the second filter and further through the gelatinized microparticles 14 piled up thereto and is then discharged from the first filter 1 as filtered water. Process waste such as semiconductor material waste, metal waste and/or insulating resin material waste, etc. generated in the CMP process by abrasive coating such as silica, alumina, or ceria, etc. or by grinding with abrasive coating, contained in wastewater, is captured and gradually piles up as gel on the surface of the second filter 2 so that water passes through the gel film and is discharged as filtered water from the first filter 1.

However, when the filtration process is carried out for a long period of time as shown in FIG. 11B, a thick gel film adheres to the surface of the second filter 2 so that the above described spaces clog and filtered water cannot be obtained any longer. In order to restore filtration capabilities, it is necessary to remove this gel film which piled up thereon.

Next, actual filtration operation using the filtration apparatus shown in FIG. 5 is described.

First, wastewater containing removables of a colloid fluid is supplied into the raw water tank 50 via pipe 51. A filter apparatus 53 having only the first filter 1 formed thereon, but not the second filter 2, is immersed into the raw water tank 50 and wastewater is circulated while applying a weak suctioning pressure from the pump 57 via pipe 56. The circulation path of the wastewater includes the filter apparatus 53, pipe 56, valve V1, pump 57, pipe 58, control valve CV1, flowmeter 61, optical sensor 62, valve V3. The wastewater is suctioned from the raw water tank 50 and is then returned to the raw water tank 50.

By causing the wastewater to circulate, a second filter 2 is formed on the surface of the first filter 1 in the filter apparatus 53 so that removables of colloid solution are finally captured.

More particularly, wastewater is suctioned at a weak suction pressure by pump 57 via a first filter 1 and as microparticles of the removables draw nearer to the first filter 1, they are turned into a gel and adhere to the surface of the first filter. The gelatinized particles which are larger than filter holes 11 provided in the first filter 1 gradually pile up on the surface of the first filter thus forming the gelatinous second filter 2. Gelatinized removables having a smaller diameter than the filter holes 1I pass through the first filter 1, whereas during the second filter 2 formation process, water inside the wastewater which is suctioned through these spaces which function as passages, passes through the first filter 1 and is then discharged as purified water.

Optical sensor 62 monitors the concentration of the particles contained in the filtered water and when it is determined that the mix rate of the microparticles is smaller than a desired value, filtration is started. Before filtration is started, valve V3 is closed based on a detection signal from the optical sensor 62 and valve V4 is opened so that the circulation path described above can be closed. Next, purified water is discharged from valve V4. Air bubbles constantly supplied by the air pump 55 and diffused by the air diffuser 54 are adjusted by the control valve CV2 and are supplied to the surface of the filter apparatus 53.

After filtration is carried out for some time, the water inside the wastewater contained in raw water tank 50 is discharged to the outside of the raw water tank 50 as purified water and accordingly, concentration of the removables inside the wastewater raises. More precisely, the colloid fluid is concentrated and viscosity thereof increases. Wastewater is thus supplied into the raw water tank 50 from pipe 51 in order to suppress the raise in wastewater concentration and to increase filtration efficiency. However, a thick gel film adheres to the surface of the second filter of the filter apparatus 53 eventually causing it to clog and impeding filtration.

When the second filter 2 clogs, a process is carried out to restore filtration capabilities thereof. In this process, pump 57 is halted and the negative suction pressure applied to the filter apparatus 53 is cancelled.

Figure 13A:
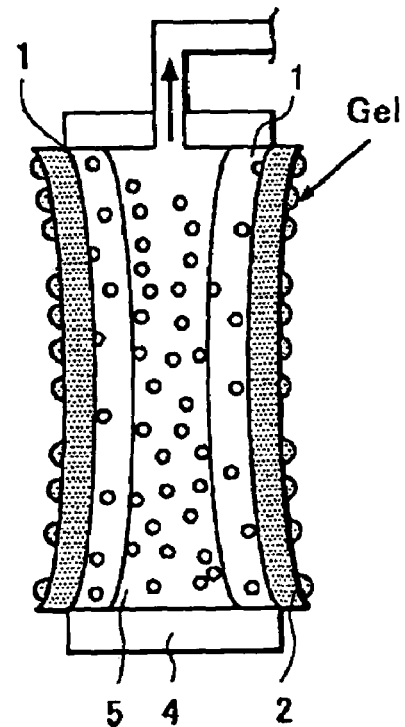
FIG. 13 shows regeneration of the filter apparatus according to an embodiment of the invention.

The filter regeneration process is next described with reference to FIG. 13 which shows pattern diagrams. FIG. 13A shows the status of the filter apparatus 53 during the filtration process. Center 5 of the first filter 1 has a negative pressure compared to its exterior, due to a weak suction pressure, so that it swells towards the inside of the first filter 1. Consequently, the second filter 2 adhered to a surface thereof also tends to swell towards the inside, and so does the gel film that gradually adheres to the surface of the second filter 2.

Figure 13B:
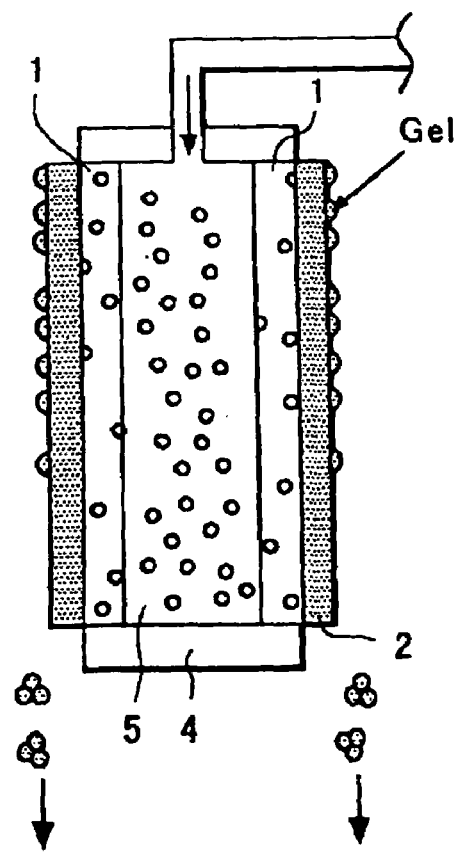

In the filter regeneration process as shown in FIG. 13B, this weak suction pressure is cancelled so that an atmospheric pressure is restored and the first filter 1 of the filter apparatus 53 returns to its original state and so do the second filter 2 and the gel film adhered to a surface thereof. As a result, the suction pressure suctioning the film gel is cancelled so that the gel film loses its adsorbability towards the filter apparatus 53 and at the same time is influenced by a force that causes it to swell towards the exterior. Consequently, the gel film starts separating itself from the filter apparatus 53 due to its own weight. In order to facilitate the removal of the gel film, the amount of air bubbles generated by the air diffuser 54 may be doubled. Experiments show that separation begins from a lower end of the filter apparatus 53 and continues with the separation of the second filter 2 adhered to the surface of the first filter 1, similar to an avalanche. Separated parts precipitate to the bottom of the raw water tank 50. Next, water is caused to circulate through the circulation path described above and the second filter 2 is re-formed. In this regeneration process, the second filter 2 is restored to its original state enabling re-filtration of wastewater.

In the filter regeneration process, supplying a back flow of filtered water to the center 5, firstly, facilitates returning of the first filter 1 to its original state and due to a hydrostatic pressure of the filtered water, a force is applied that causes a swelling to the outside, secondly, the filtered water passes through the filter holes 11 inside the first filter 1 and seeps at the boundary of the first filter 1 and second filter 2 thus facilitating separation of the gel film of the second filter 2 from the surface of the first filter 1.

When filtration is continued while the second filter 2 is regenerated, as described above, the concentration of removables from the wastewater contained in the raw water tank 50 increases and eventually so does the viscosity of the wastewater. Accordingly, if the concentration of the removables in the wastewater exceeds a certain value, the filtration process is halted and removables are left to precipitate. As a consequence, concentrated slurry accumulates at the bottom of the raw water tank 50 and is then recovered by opening valve 64. The recovered slurry is compressed or heat dried in order to further compress it by removing water contained therein. Consequently, the amount of slurry handled as industrial waste can be substantially reduced.

The operational status of the filtration apparatus shown in FIG. 5 is next described with reference to FIG. 14. Here, both sides (surface: 0.109 m$^2$) of a filter apparatus 53, size A4, as described above are used. Initial rate is set to 3 cc/h (0.08 m$^3$/day), which, as described above, is a good filtration rate, and the flow rate after filter regeneration is set to the same value. Air blow rate is set to 1.8 liters/minute during filter formation and during filtration and to 3 l/minute during filter regeneration. Pin and re-Pin are suction pressure values and are measured by the barometer 59. Pout and re-Pout are pressures of pipe 58 and are measured by barometer 60. The flow rate and re-flow rate are measured by the flowmeter 61 and show the filtration rate of the water suctioned from the filter apparatus 53.

Figure 14:
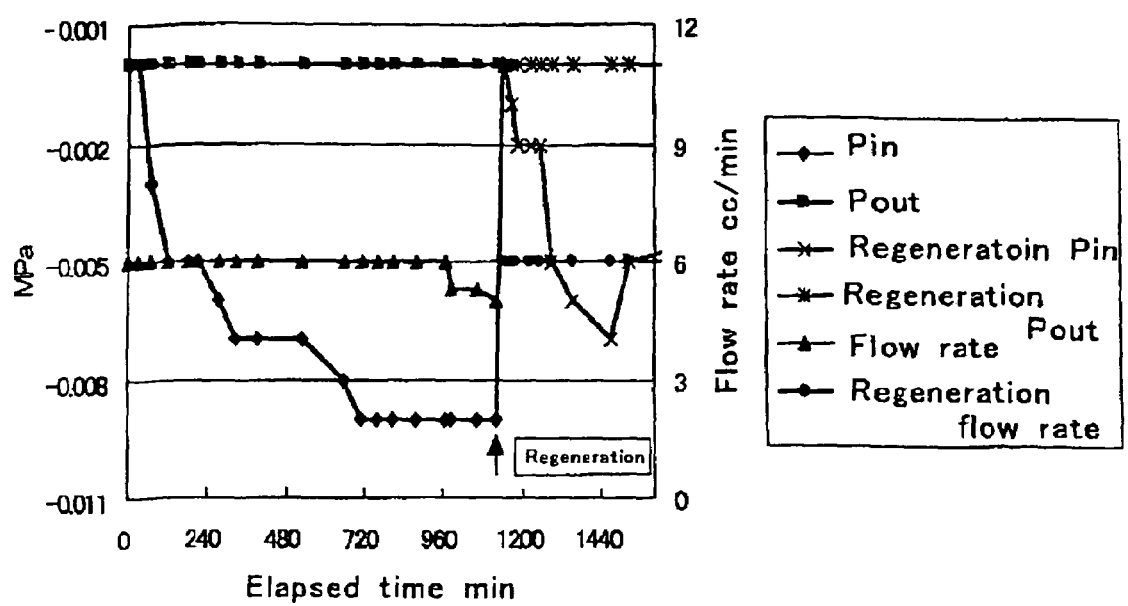
FIG. 14 shows the operation of a filtration apparatus according to an embodiment of the invention.

In FIG. 14, the Y-axis on the left side shows negative pressure (MPa) which increases as drawing closer to the X-axis. The Y-axis on the right side shows flow rate (cc/minute). The X-axis shows time elapsed (minutes) from filter formation.

The point of this invention is that during the second filter 2 formation process, the filtration process and the filtration process after the filter regeneration process, the flow rate and re-flow rate are kept at 3 cc/hour. Because of this, in the filter formation process, Pin is a very weak suction pressure, −0.001 MPa thru −0.005 MPa so that a second filter 2 is formed by the adherence of a soft gel film.

Next, in the filtration process, Pin is gradually increased from −0.005 MPa and filtration is carried out while maintaining a constant flow rate. After the filtration process is carried out for about 1000 minutes, the flow rate eventually starts to decrease, thus requiring a process of filter regeneration. The reason for such decrease is the adherence of a thick gel film on the surface of the second filter 2 causing clogging thereof.

Furthermore, after the second filter 2 regeneration process is carried out, the re-filtration operation is started at a constant re-flow rate while gradually increasing the re-Pin pressure. The second filter 2 regeneration and the re-filtration are continued until raw water 52 reaches a predetermined degree of concentration, more precisely, when the concentration degree increases from 5 times to 10 times.

Another filtration method, different from the one described above, is employed wherein filtration is carried out by setting the suction pressure to −0.005 MPa to obtain a high filtration rate. In this case, with the clogging of the second filter 2, the filtration rate gradually decreases, but filtration time is long and control of pump 57 is easy. Accordingly, regeneration of the second filter 2 may be carried out when filtration rate is reduced to or below a constant value.

Figure 15A:
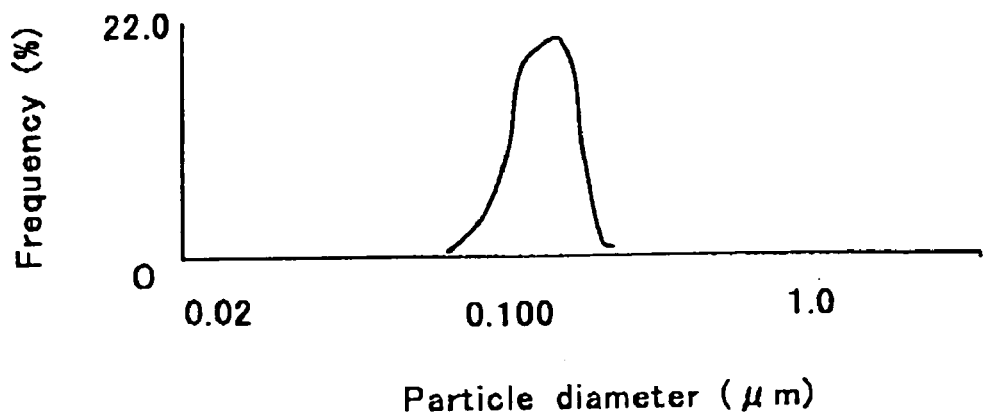
FIG. 15 shows filtration characteristics according to an embodiment of the invention.

FIG. 15A shows the particle size distribution of abrasive coating contained in the CMP slurry. This abrasive coating is used in the CMP of interlayer dielectric films comprising Si oxides and contains Si oxides commonly called silica. The minimum particle diameter is about 0.076 µm. whereas the maximum particle diameter is about 0.34 µm. These large particles are agglomerated particles formed by a plurality of particles that agglomerate. The average particle diameter is 0.1448µm with a peak distribution of 0.13 thru 0.15 µm. KOH or NH3 are commonly used as slurry adjustors and the pH is between 10 and 11.

More precisely, the CMP abrasive coating mainly comprises silica, alumina, cerium oxide, diamond, or it may also comprise chromic oxide, iron oxide, manganese oxide, BaCO$_4$, antimony oxide, zirconia, yttria. Silica is used in the planarization of semiconductor interlayer dielectric films, P-Si, SOI, etc. and in the planarization of Al/glass disks. Alumina is used in hard disk polishing, planarization of metals, Si oxide films, etc. Cerium oxide is used in glass and Si oxides polishing, chromic oxide is used in the iron and steel mirror surface polishing. Manganese oxide and $BaCO_4$ are used in the polishing of tungsten wiring.

Colloid-sized fine particles called oxides sol and comprising metal oxides or partly hydroxides such as silica, alumina, zirconia, etc. are uniformly dispersed into water or in fluid. This sol is used in the planarization of interlayer dielectric films of semiconductor devices and use thereof in information disks such as Al disks is experimented.

Figure 15B:
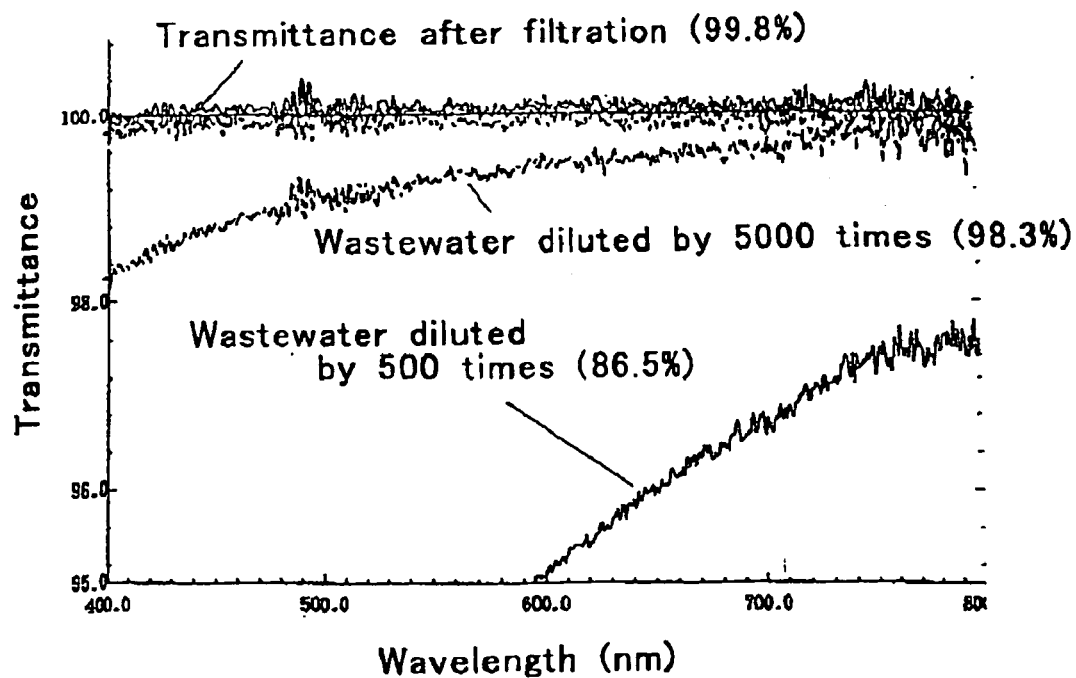
Figure 16:
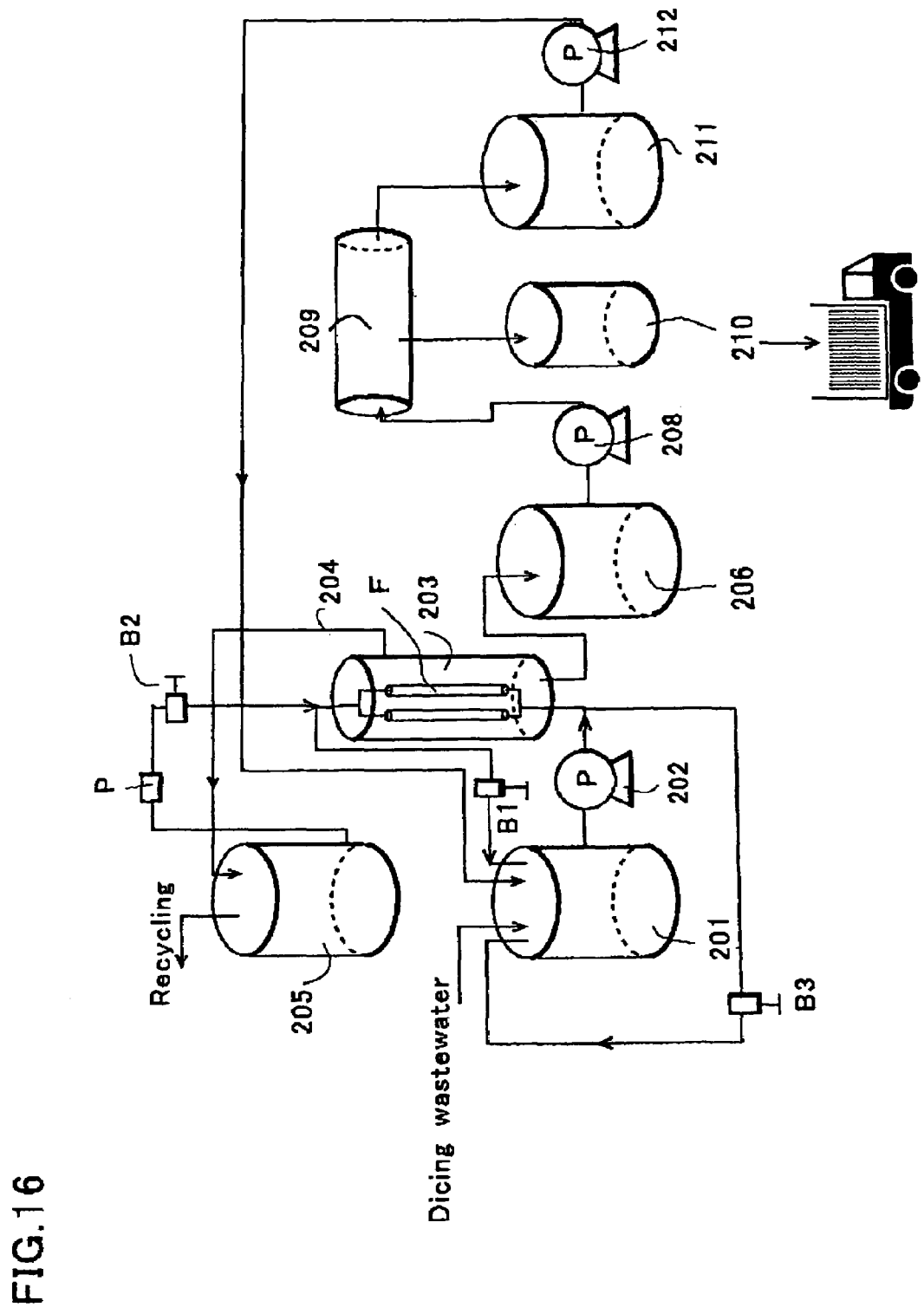
FIG. 16 illustrates a conventional filtration system.
Figure 17:
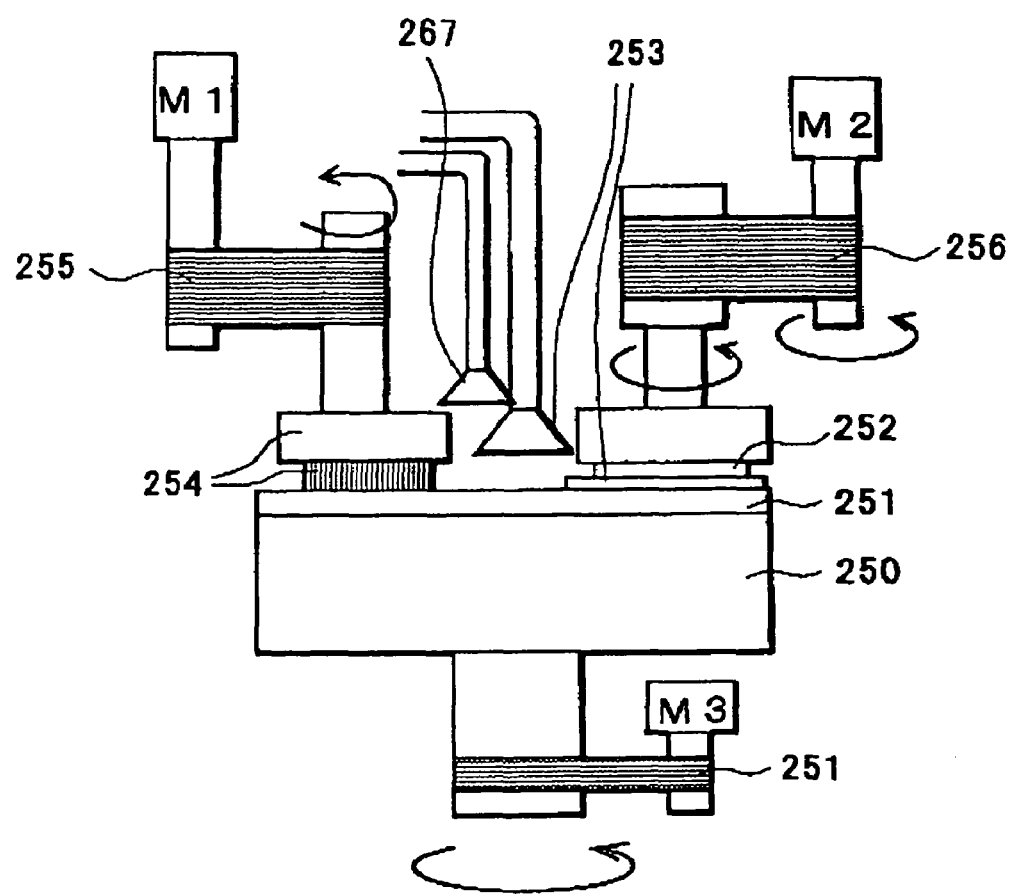
FIG. 17 shows a CMP apparatus.
Figure 18:
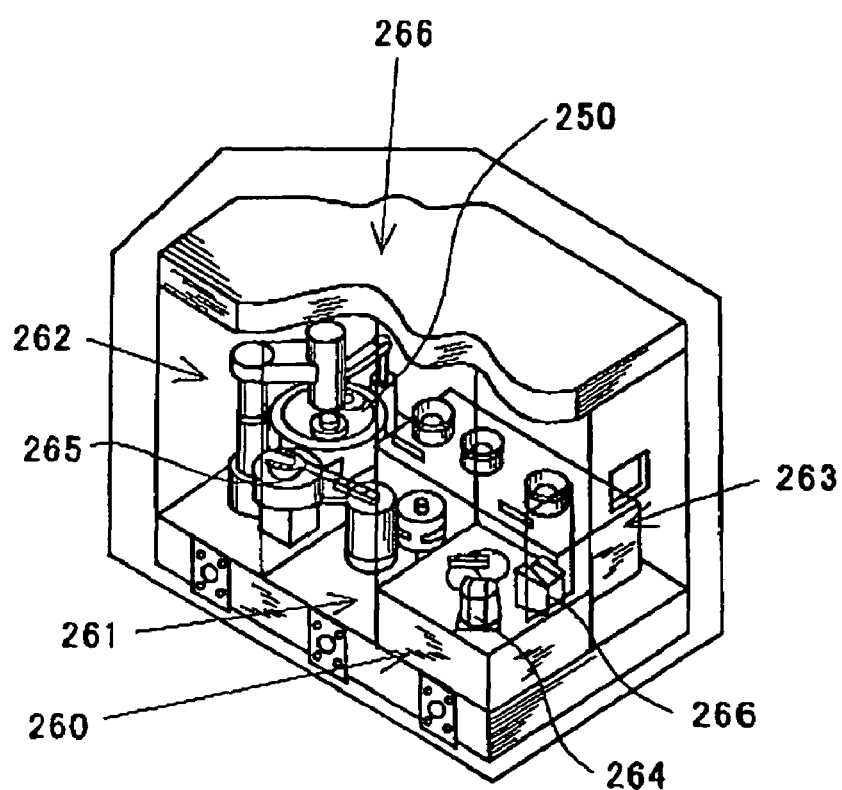
FIG. 18 shows a CMP apparatus system.

The data in FIG. 15 shows filtration of CMP wastewater and capture of the abrasive coating. Concentrate slurry solution is diluted by pure water 50 times, 500 times, 5000 times and is used as test solution. As described in the background art, since pure water is used for wafer wash in the CMP process, wastewater is believed to be diluted 50 thru 5000 times.

The light transmission of these three types of test solution, when examined with light having a wavelength of 400 nm, is 22.5% in the case of the test solution diluted 50 times, 86.5% in the case of the test solution diluted 500 times and 98.3% in the case of the test solution diluted 5000 times. In principle, if the wastewater does not contain any abrasive coating, light is not scattered and light transmission is very close to 100%.

Filters having the second filter film 13 formed thereon are immersed in the three types of test solutions and after the solution is filtered, permeability of all three types of test solutions becomes 99.8%. In other words, abrasive coating can be captured because light transmission after filtration is greater than light transmission before filtration. Permeability data of the 50 times diluted test solution does not appear in the figure because values thereof are too small.

Based on the above results, it was determined that when the removables of a colloid fluid discharged from a CMP apparatus are filtered by use of a second filter comprising a gel film and provided in a filter apparatus 53 of a filtration apparatus according to this invention, a permeability value of 99.8% can be obtained.

A description was given hereinbefore of a filtration method of a solution by use of a second filter which is a gelatinous self-generated film, however, filtration films are not limited to the gelatinous film. The apparatus and the method according to this invention can also employ other types of self-generated gels (pre-coat filters).

The invention claimed is:

1. A filtration apparatus comprising:
a tank for housing a fluid containing removables,
a filter apparatus for filtering the fluid,
a pump connected to the filter apparatus via a pipe, and
a peel cistern connected to the pipe and operable to store filtered fluid filtered by the filter apparatus, wherein the peel cistern is located at a level above a fluid level of the fluid contained in the tank,
an air diffuser located under the filter apparatus and generating air bubbles inside the fluid,
an air pump for supplying gas via an air pipe connected to the air diffuser,
wherein the air pipe comprises a first path and a second path which are parallel to each other, the first path being provided with a first adjustment valve and a first stop valve and the second path being provided with a second adjustment valve and a second stop valve,
wherein each stop valve is operable to block or release the gas that passes inside the air pipe and each adjustment valve is regulated in advance so that a predetermined amount of gas is caused to pass there through,
wherein an amount of gas flowing through the first adjustment valve is less than an amount of gas flowing through the second adjustment valve, and a controller to control operation modes of the filtration apparatus, wherein
in a filtration mode, in which the fluid is pumped from the tank through the filter apparatus by the pump, the controller is operable to control the first stop valve to be open and the second stop valve to be closed, and wherein
in a regeneration mode, in which the filtered fluid within the peel cistern flows from the peel cistern through the filter apparatus into the tank, the controller is operable to control the second stop valve to be open and the first stop valve to be closed.

2. The filtration apparatus of claim 1, wherein the air pipe is further provided with a parallel third path, the third path being provided with a third adjustment valve and a third stop valve.

3. The filtration apparatus of claim 2, wherein when any one of the stop valves is in an open state, the other stop valves are in a close state.

4. The filtration apparatus of claim 2, wherein the removables are CMP slurry.

5. The filtration apparatus of claim 2, wherein the removables comprise CMP slurry and process waste generated during the CMP process.

6. The filtration apparatus of claim 2, further comprising a valve at the bottom of the tank.

7. The filtration apparatus of claim 1 being operable to recover precipitated removables from the filtration apparatus.

8. The filtration apparatus of claim 7 wherein the precipitated removables are a gelled material.

9. A filtration apparatus comprising:
a tank for housing a fluid containing colloidal removables,
a filter apparatus formed of a first filter immersed inside the tank,
wherein the filtration apparatus is operable to form during operation a second filter comprising a gel film adhered to a surface of the first filter,
a pump connected to the filter apparatus via a pipe, and
a peel cistern connected to the pipe and operable to store filtered fluid filtered by the filter apparatus, wherein the peel cistern is located at a level above a fluid level of the fluid contained in the tank,
an air diffuser located under the filter apparatus and generating air bubbles inside the fluid,
an air pump for supplying gas via an air pipe connected to the air diffuser,
wherein the air pipe comprises a first path and a second path which are parallel to each other, the first path being provided with a first adjustment valve and a first stop valve and the second path being provided with a second adjustment valve and a second stop valve,
wherein each stop valve is operable to block or release the gas that passes inside the air pipe and each adjustment valve is regulated in advance so that a predetermined amount of gas is caused to pass there through,
wherein an amount of gas flowing through the first adjustment valve is less than an amount of gas flowing through the second adjustment valve
a controller to control operation modes of the filtration apparatus, wherein
in a filtration mode, in which the fluid is pumped from the tank through the filter apparatus by the pump, the controller is operable to control the first stop valve to be open and the second stop valve to be closed, and wherein in a regeneration mode, in which the filtered fluid within the peel cistern flows from the peel cistern through the filter apparatus into the tank, the controller is operable to control the second stop valve to be open and the first stop valve to be closed.

10. The filtration apparatus of claim 9, wherein the air pipe is further provided with a parallel third path, the third path being provided with a third adjustment valve and a third stop valve, so that when filtration by the filter apparatus is halted, only the third stop valve is in an open state.

11. The filtration apparatus of claim 9, wherein when any one of the stop valves is in an open state, the other stop valves are in a close state.

12. The filtration apparatus of claim 9, being operable to perform filtration using the filter apparatus by keeping the first valves only in an open state and mixing the fluid inside the tank by the air bubbles generated from the air diffuser.

13. The filtration apparatus of claim 9, being operable to separate the second filter comprising a gel film from the first filter by keeping the second valves only in an open state and generating air bubbles inside the tank by means of the air diffuser.

14. The filtration apparatus of claim 9 being operable to recover precipitated removables from the filtration apparatus.

15. The filtration apparatus of claim 14 wherein the precipitated removables are a gelled material.

* * * * *